United States Patent [19]
Yoshida et al.

[11] Patent Number: 5,959,414
[45] Date of Patent: Sep. 28, 1999

[54] MOIRE REDUCING APPARATUS

[75] Inventors: Masahiro Yoshida, Katano; Katsuhisa Kitada, Mino; Yoshio Seki, Osaka, all of Japan

[73] Assignee: Matsushita Electric Industrial Co., Ltd., Osaka, Japan

[21] Appl. No.: 09/033,072

[22] Filed: Mar. 2, 1998

Related U.S. Application Data

[62] Division of application No. 08/677,939, Jul. 10, 1996, Pat. No. 5,777,441.

[30] Foreign Application Priority Data

| Jul. 10, 1995 | [JP] | Japan | 7-198004 |
| May 8, 1996 | [JP] | Japan | 8-113601 |

[51] Int. Cl.$^6$ .......... H04N 3/26; H04N 17/00; G09G 1/04; H01J 31/26
[52] U.S. Cl. .......... 315/382; 315/371; 315/10; 348/189; 348/806
[58] Field of Search .......... 315/10, 371, 382, 315/382.1; 348/189, 806

[56] References Cited

U.S. PATENT DOCUMENTS

| 4,410,841 | 10/1983 | Dusard et al. | 315/382 |
| 4,887,010 | 12/1989 | Fujimura | 315/370 |
| 5,414,330 | 5/1995 | Tsujihara et al. | 315/371 |
| 5,430,502 | 7/1995 | Yamazaki et al. | 348/806 |
| 5,747,933 | 5/1998 | Beeteson et al. | 315/1 |

FOREIGN PATENT DOCUMENTS

| 56-168473 | 12/1981 | Japan . |
| 62-289088 | 12/1987 | Japan . |
| 5-236291 | 9/1993 | Japan . |

OTHER PUBLICATIONS

Suzuki et al., "40 Inch CRT Display for Hi–Vision," Journal of the Institute of Television Engineers of Japan, pp. 30–37, vol. 39, No. 12, 1985.

*Primary Examiner*—Edward P. Westin
*Assistant Examiner*—Shane R. Gardner
*Attorney, Agent, or Firm*—Smith, Gambrell & Russell; Beveridge, DeGrandi, Weilacher & Young Intellectual Property Group

[57] ABSTRACT

Scanning lines are automatically shifted by using a test signal for detecting a screen display height, a detector which detects information of the screen display height from the test signal, a calculator which calculates a scanning-line shift amount, a moire correcting waveform generator which generates a voltage for shifting the scanning lines, and a deflecting device which deflects electron beams.

10 Claims, 28 Drawing Sheets

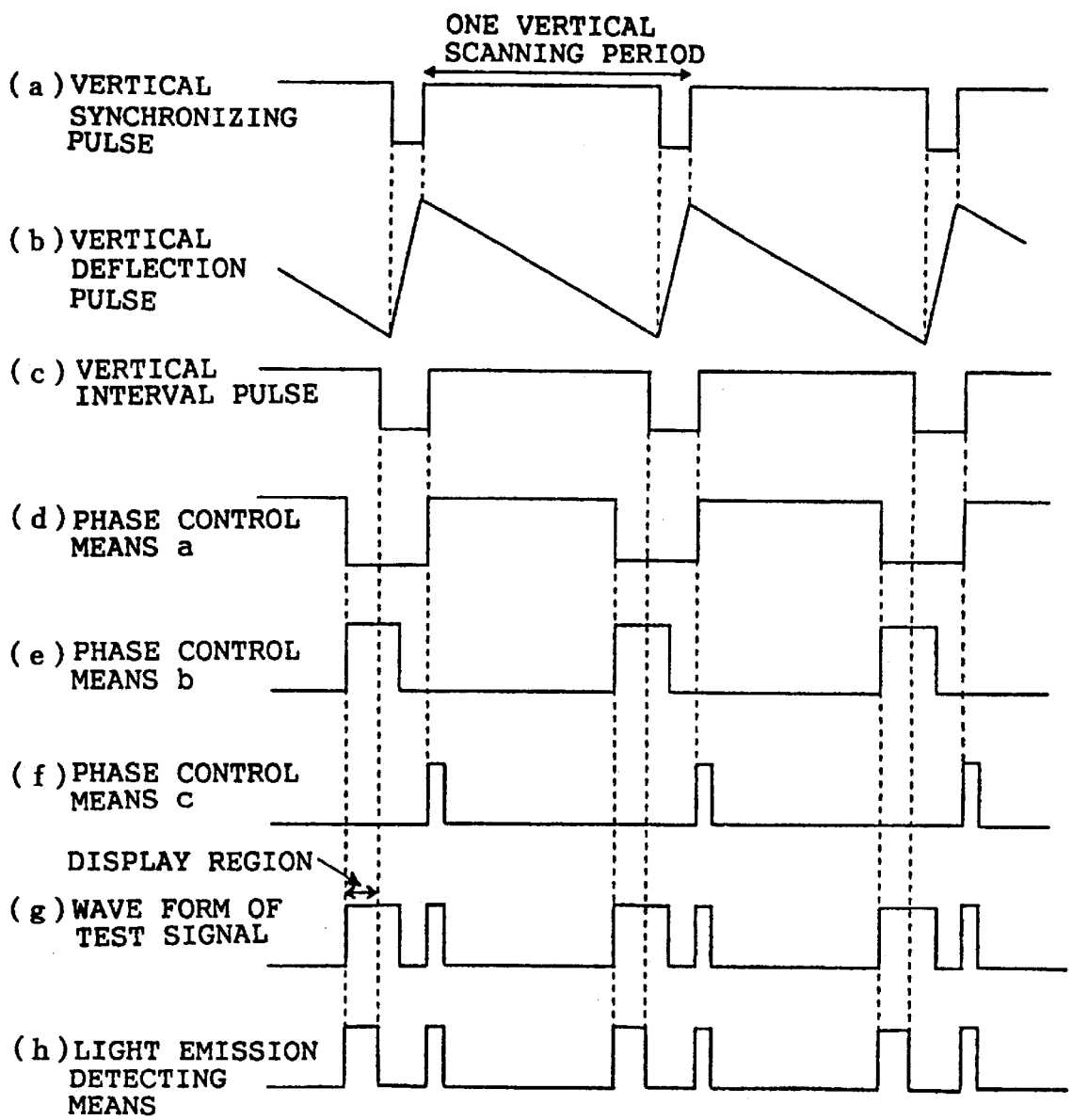

SCREEN

SCREEN (a) VERTICAL SYNCHRONIZING SIGNAL (b) CONTROL SIGNAL (c) WAVEFORM ACROSS CAPACITOR (d) WAVEFORM ACROSS CAPACITOR

MOIRE REDUCING APPARATUS

This application is a division of application Ser. No. 08/677,939, filed Jul. 10, 1996, now U.S. Pat. No. 5,777,441.

BACKGROUND OF THE INVENTION

1. Field of the Invention

The invention relates to a moire reducing apparatus for reducing so-called raster moire which is caused by interference between scanning lines and phosphors arranged in a vertical direction and capable of being luminous without being blocked by a shadow mask in a display apparatus utilizing a CRT (cathode-ray tube) such as a television receiver or the like.

2. Related Art of the Invention

A conventional moire reducing apparatus is described in, for example, Japanese Patent Publication (Kokai) No.HEI5-236291.

As shown in FIG. 33(A) the conventional moire reducing apparatus comprises: a frequency divider circuit 321 which divides the frequency of the vertical synchronizing signal so as to double the period and outputting a control signal; a switching circuit 322 which controls a shift amount of scanning lines in a vertical direction in accordance with the control signal from the frequency divider circuit; a vertical deflection circuit 323 which generates a deflection waveform, i.e., a so-called saw-tooth wave used for deflecting electron beams in the vertical direction, in accordance with the vertical synchronizing signal; a vertical coil which deflects the electron beams in the vertical direction; a correcting capacitor which conducts the S correction to correct the deflected amount of the electron beams so as to coincide with the curvature in the vertical direction; and a resistor which adds a DC current used for shifting the scanning lines in each field.

The operation of the conventional moire reducing apparatus having the above-described configuration will be described. The vertical synchronizing signal is input into the frequency divider circuit. The frequency divider circuit outputs the control signal having a period which is two times the vertical period to the switching circuit. The switching circuit is turned on or off (opened or closed) in accordance with the input control signal. When the switching circuit is in the on state, a constant current is supplied to the capacitor via the resistor. When the switching circuit is in the off state, any current is not supplied to the capacitor. See FIG. 33(B).

As described above, when the switching circuit is in the on state, that is, in the second field, a constant voltage is superposed on the capacitor for S correction via the resistor, so that scanning lines in the second field are shifted. As a result, the scanning lines in the second field can be shifted over the entire screen. See FIG.(C).

In this manner, the deflection current flowing through the vertical deflection coil is varied for each field, and the display position on the screen is vertically shifted for each vertical period, so that the density (contrast) of moire can be weakened and raster moire can be reduced.

In such a conventional moire reducing apparatus, however, the shift amount of scanning lines required for reducing moire must be manually adjusted in the case where the moire wavelength at which moire is visually noticeable is varied because of variation in the number of scanning lines per unit length. For example, such a case occurs when some variation is caused in the heights of display screens during production, when the user changes the height of the displayed image on the screen, or when the system of the input signal is changed. This produces a problem in that an optimum moire reducing effect cannot be automatically attained so that the image quality is deteriorated.

In the case where there is a so-called deflection distortion such as the pincushion distortion on the display screen, the optimum shift amount of scanning lines is varied depending on a position on the screen. This produces a problem in that moire cannot be uniformly reduced over the entire screen.

SUMMARY OF THE INVENTION

It is an object of the invention to provide a moire reducing apparatus in which a shift amount of scanning lines or a focus characteristic that can realize an optimum moire reduction is calculated based on the display height and the number of displayed scanning lines on the actual screen, and then automatically adjusted, whereby raster moire can be reduced with high accuracy and less image deterioration.

A moire reducing apparatus of the present invention comprises:

test signal generating means for generating a test signal which is synchronized with a vertical interval pulse, and supplying the test signal to a CRT;

light emission detecting means for detecting a scanning position of the test signal output by the test signal generating means, at the CRT;

calculation means for detecting an actual screen display height from an output of the light emission detecting means, and calculating a focus diameter of electron beams in a vertical direction required for reducing moire;

focus correcting waveform generating means for generating a waveform for controlling a focus of the CRT, by using the vertical synchronizing signal, a horizontal synchronizing signal, and a moire correcting waveform;

vertical amplitude control means for supplying a DC voltage for adjusting the screen display height in a vertical direction;

vertical deflection means for generating a saw-tooth wave for deflecting electron beams in the vertical direction, by using an output voltage of the vertical amplitude control means and the vertical synchronizing signal.

With the above-described configuration, the scanning position of the test signal in the CRT is detected by the light emission detecting means, the display height on the actual screen is obtained, and focus diameter of electron beams in a vertical direction is calculated. The electron beams are automatically focussed based on the calculated focus diameter in a vertical direction. Accordingly, even if the moire wavelength is varied because of a change of the scanning line spacing, such as in the case where the screen display height is changed in the adjustment process in the factory or arbitrarily changed by the user, moire can be automatically reduced and the deterioration of image quality can be suppressed.

BRIEF DESCRIPTION OF THE DRAWINGS

FIG. 3 is a waveform chart showing the operation of the first embodiment of the present invention;

PREFERRED EMBODIMENTS

Figure 1:
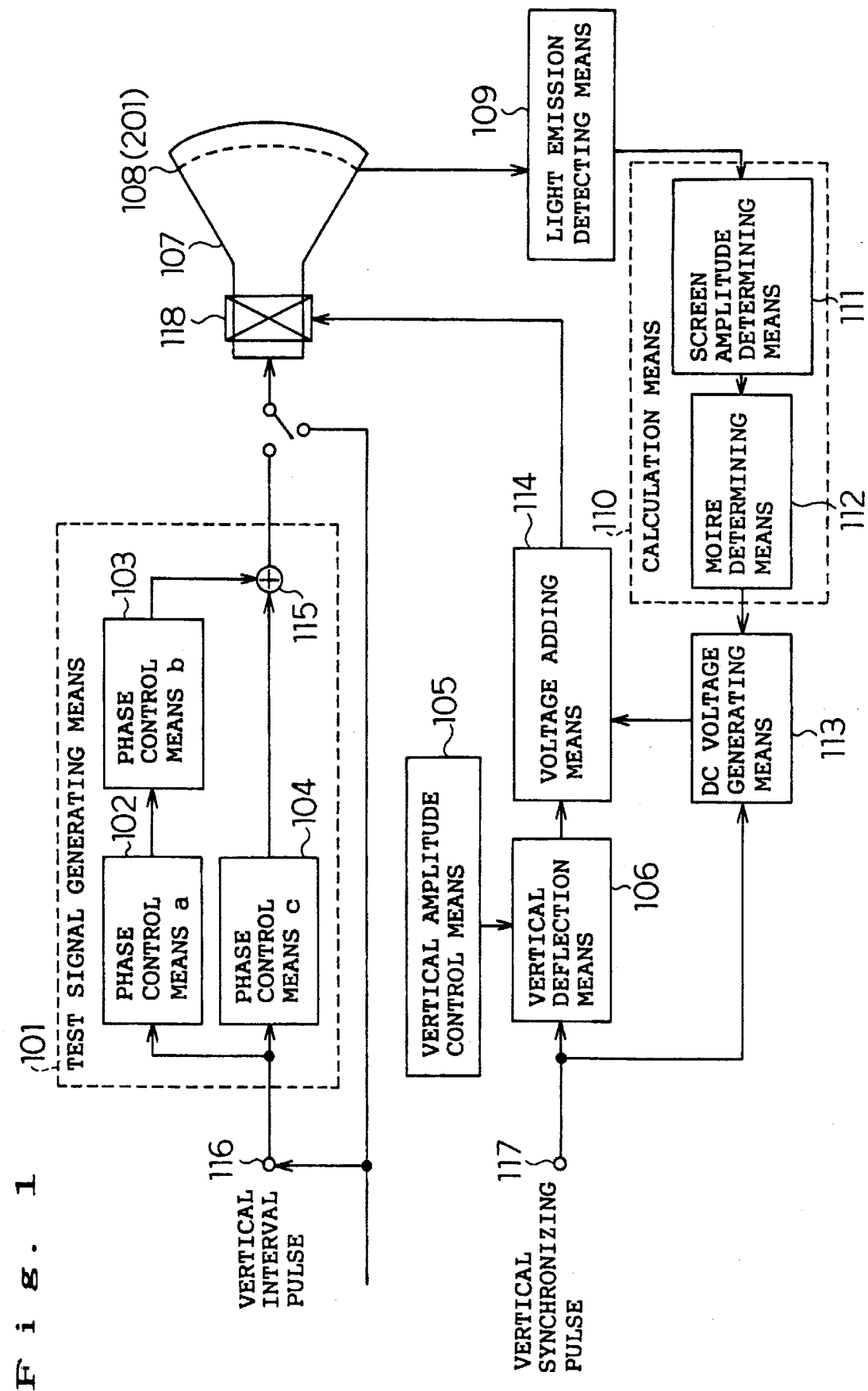
FIG. 1 is a block diagram of a moire reducing apparatus of a first embodiment of the present invention.

A moire reducing apparatus of a first embodiment of the invention will be described with reference to FIGS. 1 to 8. FIG. 1 is a block diagram of the moire reducing apparatus of the first embodiment. In FIG. 1, test signal generating means 101 generates a test signal which is synchronized with a vertical interval pulse supplied to an input terminal 116, and supplies the test signal to a CRT 107. The test signal generating means 101 comprises, for example, phase control means a 102, phase control means b 103, phase control means c 104, and an adder 115. Vertical amplitude control means 105 supplies a DC voltage for adjusting a screen display height in a vertical direction. Vertical deflection means 106 generates a saw-tooth wave for deflecting electron beams in the vertical direction, by using the output voltage of the vertical amplitude control means 105 and the vertical synchronizing pulse. The reference numeral 108 designates a shadow mask placed in the CRT 107. A luminous element is applied to at least one portion of a face of the shadow mask 108 on the side of an electron gun, over a predetermined length in the vertical direction, for example, from the top end to the bottom end of the shadow mask 108. Light emission detecting means 109 detects light emission of the luminous element applied on the shadow mask 108. Calculation means 110 measures a light emission time period from the output of the light emission detecting means 109, and calculates the information of the actual screen display height. The calculation means 110 then determines an optimum scanning-line shift amount for reducing moire. The calculation means 110 comprises, for example, screen amplitude determining means 111 and moire determining means 112. DC voltage generating means 113 generates a DC vertical shift voltage which is synchronized with the vertical synchronizing signal, based on the output of the calculation means 110. Voltage adding means 114 adds the output of the DC voltage generating means 113 to that of the vertical deflection means 106, and applies the resulting voltage to a deflection coil 118 which deflects electron beams.

Figure 2A:
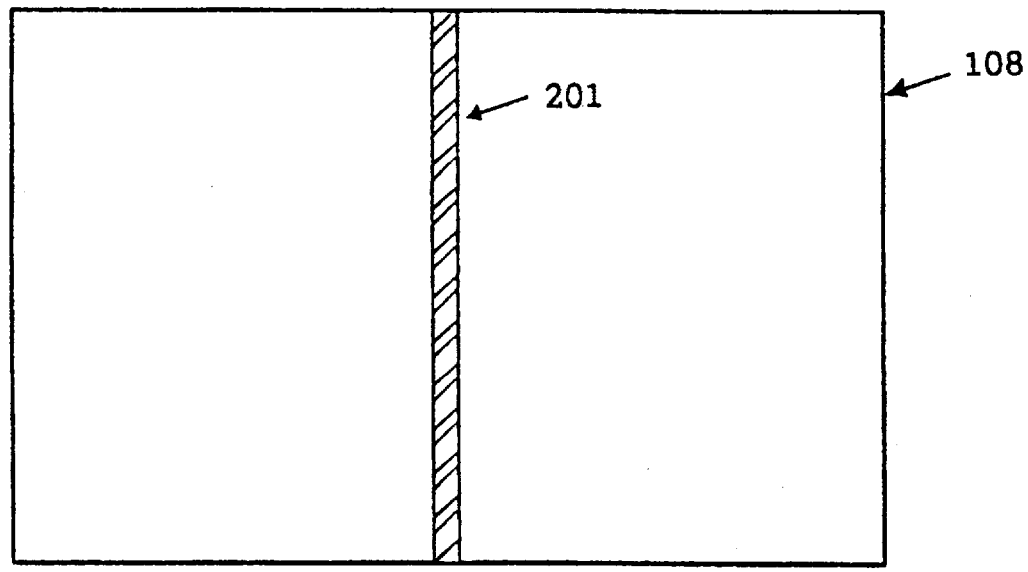
FIG. 2 is a section view showing a shadow mask in the first embodiment of the present invention.
Figure 2B:
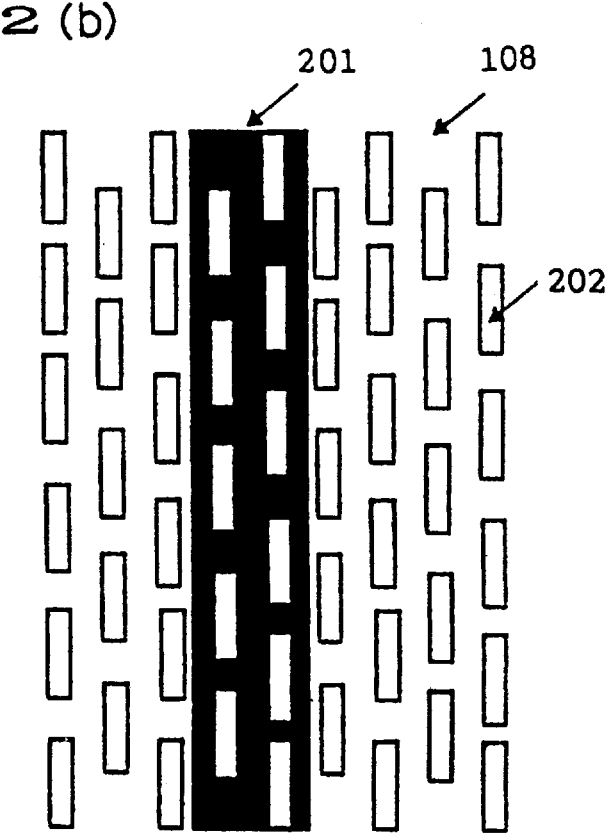

FIG. 2 shows relationships between the shadow mask 108 and the applied luminous element. FIG. 2(a) shows an overview of the shadow mask. The reference numeral 108 designates the shadow mask, and 201 designates the luminous element. The luminous element 201 is applied to a predetermined position of the face of the shadow mask 108 on the side of the electron gun, for example, to a center portion along the vertical direction. FIG. 2(b) is an enlarged view of the applied portion of the luminous elements 201. The reference numeral 202 designates electron-beam passing holes through which electron beams pass to cause RGB phosphors applied on the inner face of the CRT to be luminous. As shown, the luminous element is applied to a portion excluding the electron-beam passing holes, so that the light emission of the luminous element does not affect the screen. The light emission detecting means 109 consists of a light receiving element which is located at a position corresponding to the luminous element 201, so as to detect light emitted from the luminous element 201.

First, operations of generating a test signal and detecting the display screen height in the moire reducing apparatus of the embodiment having the above-described configuration will be described with reference to the waveform chart of FIG. 3.

The phase control means a 102 which is a component of the test signal generating means 101 shown in FIG. 1 generates a pulse shown in FIG. 3(d) which is synchronized with a rising edge of a vertical interval pulse shown in FIG. 3(c) and has a sufficiently long high-level period in one vertical scanning period. The phase control means b 103 generates a pulse shown in FIG. 3(e) which is synchronized with a falling edge of the pulse shown in FIG. 3(d) generated by the phase control means a 102 and has a high-level period which overlaps the vertical interval pulse. The phase control means c 104 generates a pulse shown in FIG. 3(f) which is synchronized with a rising edge of the vertical interval pulse (c) and has a short pulse width and a period equal to or longer than one horizontal period. The adder 115 adds the pulses from the phase control means b 103 and the phase control means c 104 (the signal pulses of FIGS. 3(e) and (f)) to each other, and supplies a test signal shown in FIG. 3(g) to the CRT 107. At this time, the light emission detecting means 109 outputs pulses shown in FIG. 3(h) because a blanking operation is performed so as to suppress light emission during the time period corresponding to the interval pulse in the test signal waveform (g). In this way, pulses having an edge respectively corresponding to the start and the end of a video period are output.

Figure 4:
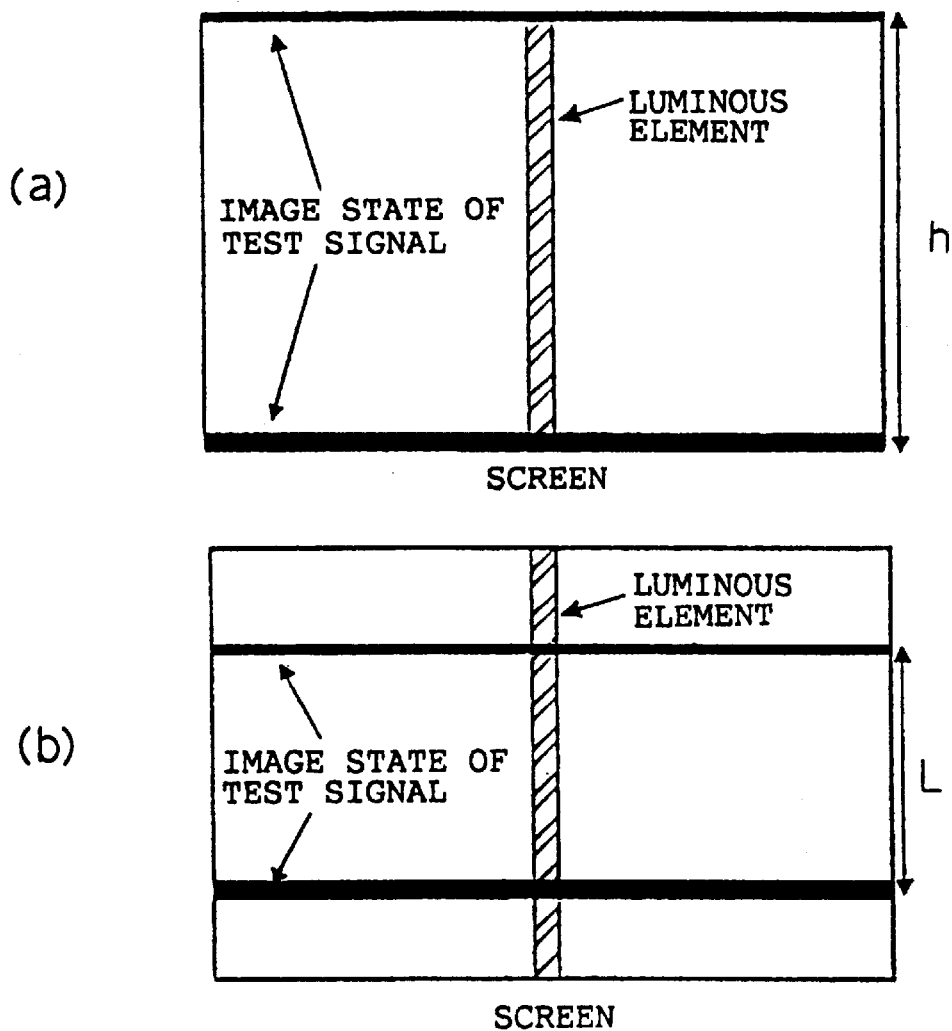
FIG. 4 is a view of a CRT screen showing relationships between a luminous element and a test signal in the first embodiment of the present invention.
Figure 5:
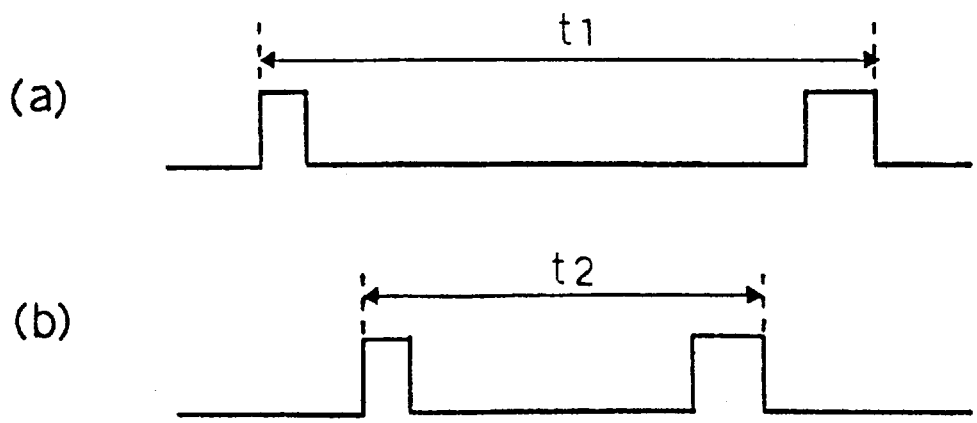
FIG. 5 is a waveform chart showing the output of the luminous element in the first embodiment of the present invention.

Next, an operation of calculating an optimum shift amount for reducing moire will be described with reference to the diagram of FIG. 4 showing relationships between the luminous element and the test signal and the waveform chart of a detection signal shown in FIG. 5.

FIG. 4 shows relationships between the test signal and the luminous element in an actual CRT. In FIG. 4, (a) shows relationships between the test signal and the luminous element in a normal display (in a just scan display in which the size of the display is equal to the screen size), and (b) shows those in the case where the vertical size is reduced (i.e., in a so-called under scan display). FIGS. 5(a) and 5(b) show the waveforms of the output signals of the light emission detecting means 109 which are obtained in the cases of FIGS. 4(a) and (b), respectively.

First, the vertical amplitude control means 105 shown in FIG. 1 is controlled and a voltage is applied so that the rising edge of the first pulse and the falling edge of the second pulse of the light emission detection signal of the light emission detecting means 109 coincide with the falling edge and the rising edge of the interval pulse, respectively, as shown in FIG. 3(h). In other words, the control is performed so as to realize a just scan condition in which the screen height of the CRT corresponds to the start and end of the test signal. In this condition, the light emission detecting means 109 measures the time period from the rising edge of the first pulse to the falling edge of the second pulse of the light emission detection signal of the light emission detecting means 109.

Next, the light emission detecting means 109 measures the time period from the rising edge of the first pulse to the falling edge of the second pulse of the light emission detection signal in the actual display screen, for example, in the case of the under scan display as shown in FIG. 4(b).

When the light emission time period in the case where the display is performed over the entire screen is denoted by t1 as shown in FIG. 5(a), the light emission time period in the actual use is denoted by t2 as shown in FIG. 5(b), the screen height of the CRT is denoted by h (known), and the actual display height is denoted by L, the actual display height can be obtained by a proportional relationship as follows:

$$L=(t2/t1)\times h$$

Accordingly, the actual screen height is calculated by the screen amplitude determining-means 111 constituting the calculation means 110, and the optimum scanning-line shift amount is calculated by the moire determining means 112 from the calculated screen height L and the number m of scanning lines of the input signal. The number m of scanning lines is determined depending on the signal system. In the high-vision system, for example, the number m of effective scanning lines in the display area is 1,035. In this case, the spacing s of scanning lines is obtained as follows:

$$s=L/m$$

Figure 6:
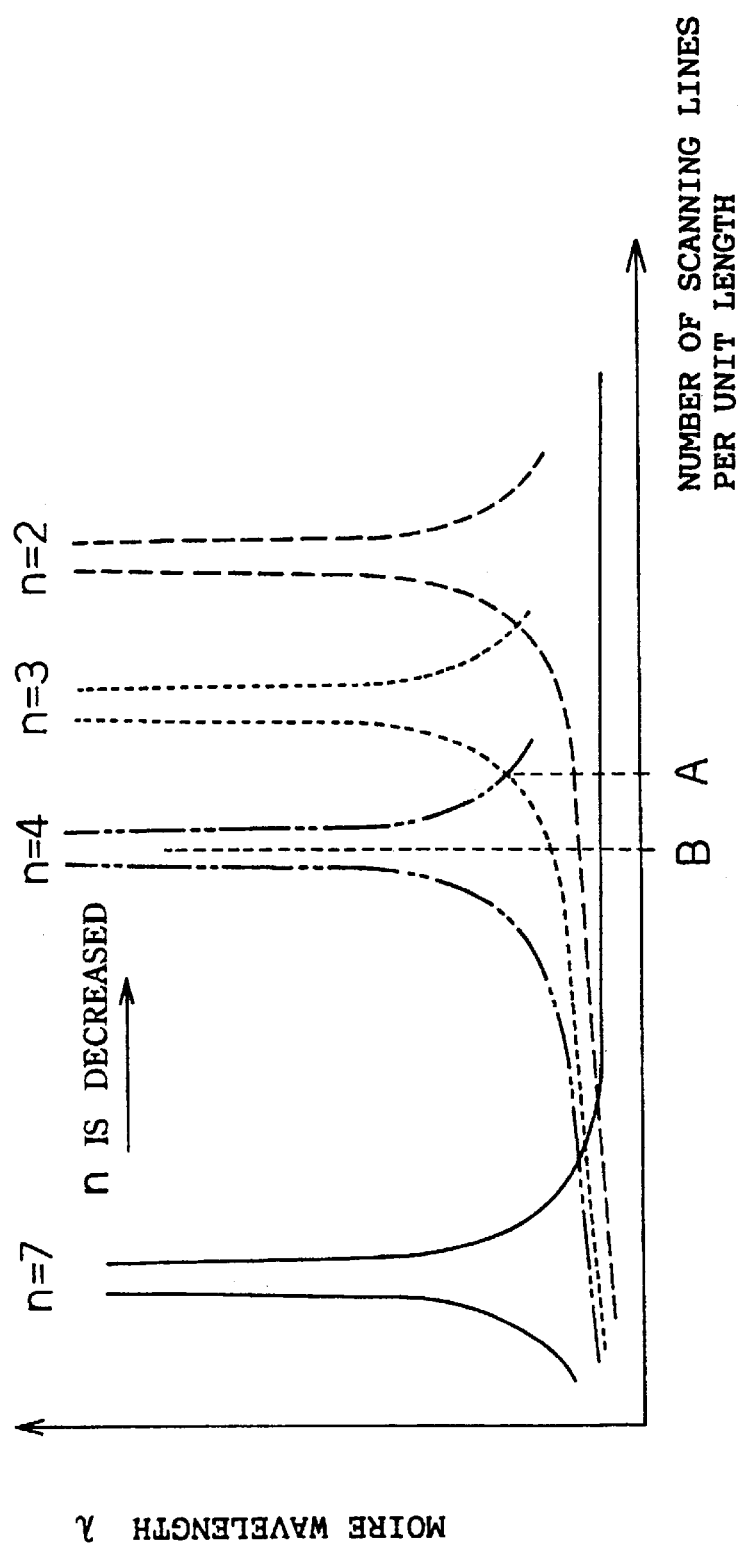
FIG. 6 is a diagram showing relationships between the number of scanning lines per unit length and the moire wavelength in the first embodiment of the present invention.
Figure 7:
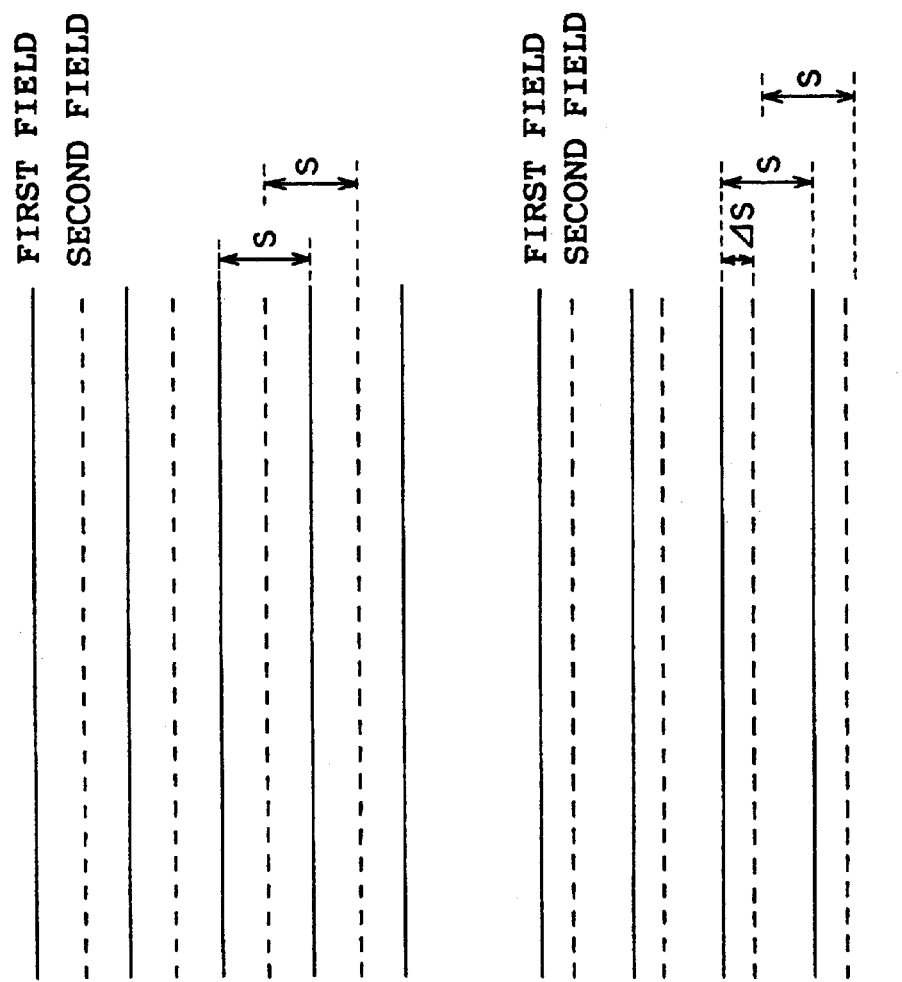
FIG. 7 is a diagram showing relationships of scanning lines in the first embodiment of the present invention.

The method of calculating the scanning-line shift amount in the moire determining means 112 will be described. FIG. 6 is an explanatory diagram showing relationships between the number of scanning lines per unit length and the moire wavelength $\lambda$. When the scanning line spacing is denoted by s as shown in FIG. 7(a), the actual scanning line spacing s is obtained by s=L/m as described above by using the calculated screen height L and the number m of scanning lines of the input signal.

Although not shown, the dot pitch of phosphors in the vertical direction is denoted by a, the dot radius of a phosphor is denoted by b, the beam spot diameter is denoted by d, and the degree of harmonic of the scanning-line pattern is denoted by n. Because moire is caused by sampling the scanning-line pattern in accordance with the dot pattern of phosphors, moire is obtained by a product of expansions in Fourier series of the scanning-line pattern and the dot pattern of phosphors.

Specifically, as described in THE JOUNAR OF THE INSTITUTE OF TELEVISION ENGINEERS OF JAPAN, Vol. 30, December, pp. 30–37, the moire wavelength $\lambda$ and the moire contrast M are obtained from a product of the two expansions in Fourier series as follows:

$$\lambda=1/|2/a-n/s|$$

$$M=\{J1\ (4c)/c\}\cdot \exp(-\pi^2 d^2 n^2/12s^2)$$

where $c=\pi\cdot b/a$, and J1 denotes a first Bessel function.

When a moved amount of scanning lines in the second field with respect to the first field is denoted by $\Delta s$ as shown in FIG. 7(b), the moire wavelength $\lambda$ and the contrast M are obtained by a product of expansions in Fourier series of the scanning-line pattern and phosphors as follows:

$$\lambda=1/|2/a-n/s|$$

$$M=\{(J1(4c)/c\}\cdot \exp(-\pi^2 d^2 n^2/12s^2)\times |\cos(\pi n\Delta s/s)|$$

Figure 8:
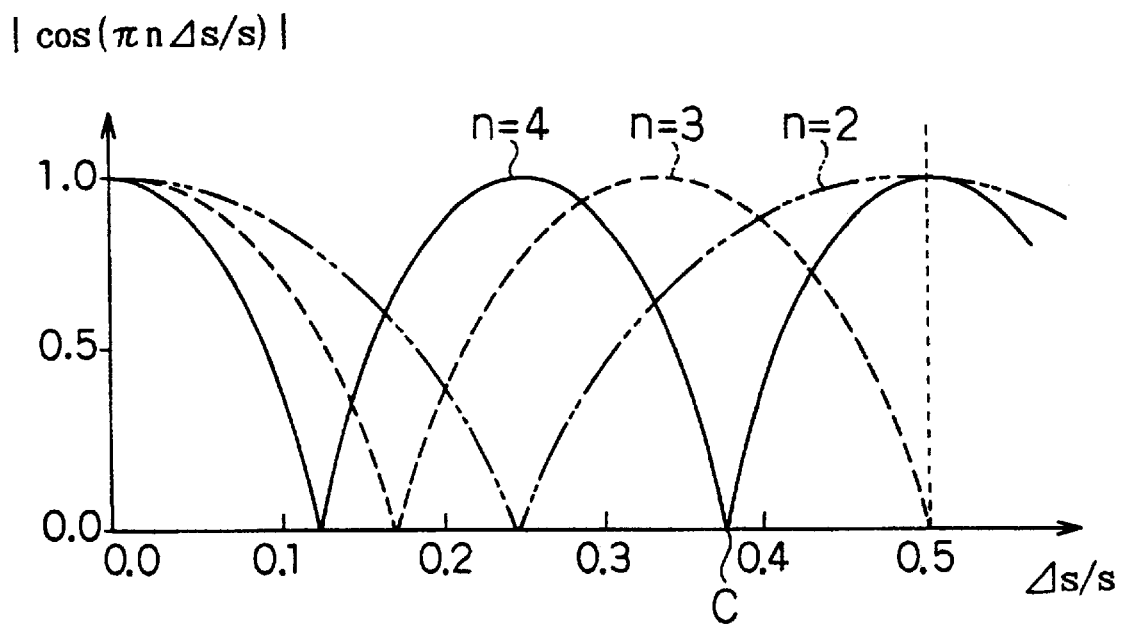
FIG. 8 is a diagram showing relationships of contrast in the first embodiment of the present invention.

FIG. 8 shows relationships between the number of scanning lines per unit length and the density (contrast) of moire by using the above-mentioned expressions.

The dot pitch a of phosphors is generally set so as to have a value at which moire is most unnoticeable in the employed scanning system. As for FIG. 6, for example, a point A is selected. When the display screen height is changed, however, the number of scanning lines per unit length is changed. As a result, in some conditions, for example, at a position of a point B, the moire wavelength at n=4 is increased as seen from FIG. 6. If the contrast of moire exceeds a certain threshold value, moire is visibly noticeable.

However, if the scanning-line shift amount Δs is selected so that the nth-order contrast M at which the moire wavelength λ is the maximum is approximately equal to 0, moire can be made invisible even when the moire wavelength is large.

In this example, the moire contrast M can be set to be zero by shifting the position of the second field so that the contrast at n=4 is zero, that is, the relationship of Δs/s corresponds to the position of the point C in FIG. 8.

As described above, the moire determining means 112 obtains the number of scanning lines per unit length from the information of the actual screen display height and the number of effective scanning lines. Then, the moire determining means 112 calculates the moire wavelength λ and the contrast M by using the obtained number, and calculates the scanning-line shift amount at which the contrast M in the nth order at the maximum wavelength is to be approximately zero. The calculated scanning-line shift amount is output to the DC voltage generating means 113.

The DC voltage generating means 113 generates a DC voltage at which the scanning-line shift amount in the second field is to be Δs, and the generated DC voltage is output to the voltage adding means 114.

The voltage adding means 114 adds the output of the DC voltage generating means 113 to the saw-tooth wave output from the vertical deflection means 106, so that a deflection current by which the display position is moved by Δs for each field is applied to the deflection coil 118.

As described above, according to the embodiment, the luminous element is applied in the vertical direction to a central portion of the inside of the shadow mask of the CRT, and light emission of the luminous element is detected by the light emission detecting means. The screen height is derived from the light emission time period by the screen amplitude determining means, so that the information of the actual screen amplitude is obtained. As a result, an optimum shift amount can be realized even if the screen amplitude is changed during production or by the user. Thus, it is possible to attain a moire reducing effect with high accuracy and without any image deterioration.

Figure 9:
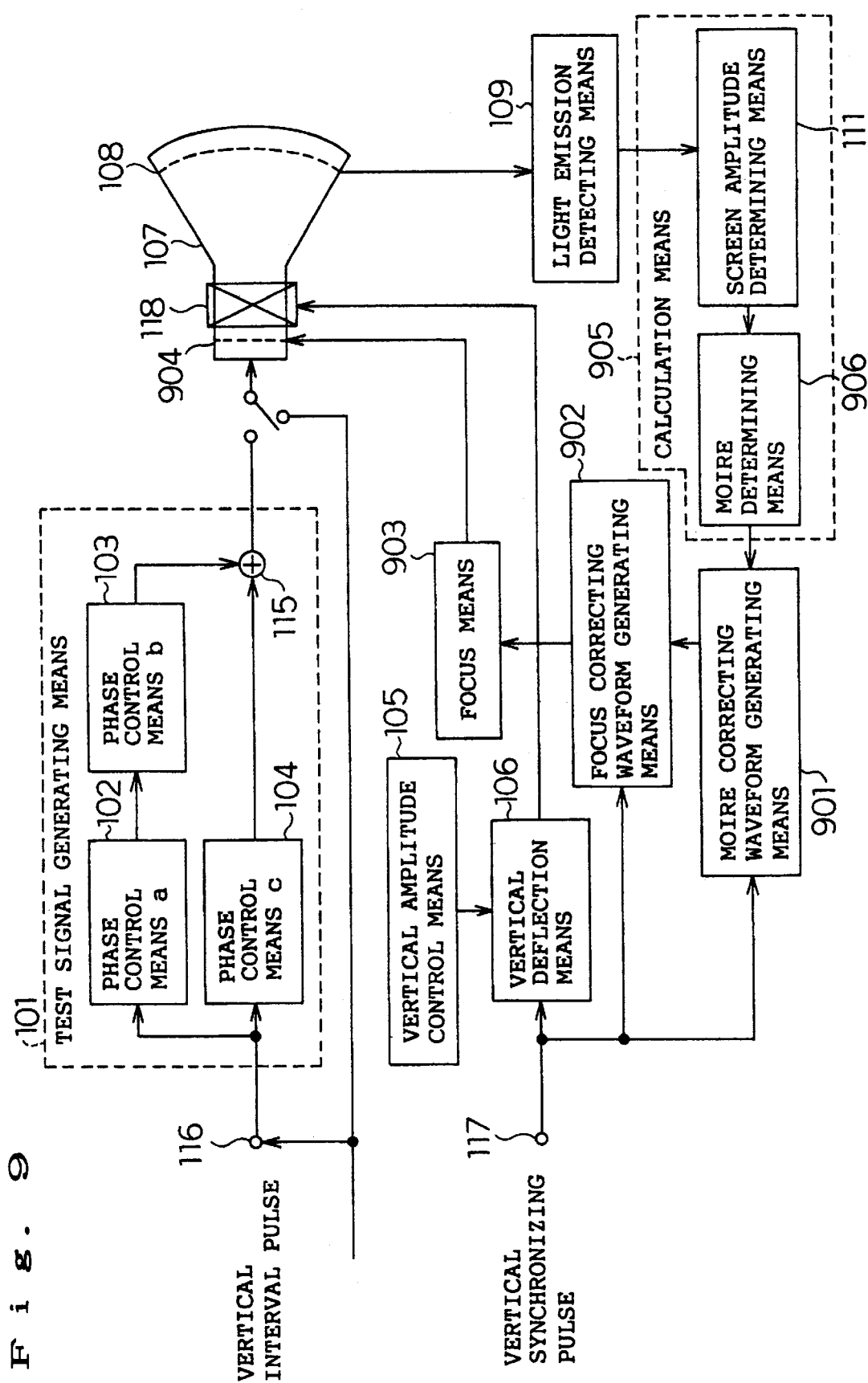
FIG. 9 is a block diagram of a moire reducing apparatus of a second embodiment of the present invention.

A moire reducing apparatus of a second embodiment of the invention will be described with reference to FIG. 9. FIG. 9 is a block diagram of the moire reducing apparatus of the second embodiment. The components having the same functions as those in the block diagram of the first embodiment are designated by the same reference numerals and their description is omitted. The generation and detection of the test signal, the generation of the deflecting saw-tooth wave, and the method of applying the wave to the deflecting coil 118 are the same as those in the first embodiment, and hence their description is omitted.

In FIG. 9, focus correcting waveform generating means 902 generates a waveform for focus correction from a synchronizing pulse and the output of moire correcting waveform generating means 901. Focus means 903 amplifies the output of the focus correcting waveform generating means 902 to a desired amplitude. The output of the focus means 903 is applied to a focus electrode 904. Calculation means 905 measures the light emission time period from the output of the light emission detecting means 109, and derives the information of the actual screen display height. Then, the calculation means 905 generates a focus control signal so that moire is minimum. The calculation means 905 comprises, for example, the screen amplitude determining means 111 and moire determining means 906. In accordance with the output of the moire determining means 906, the moire correcting waveform generating means 902 outputs a correction signal to the focus correcting waveform generating means 902 in synchronization with the synchronizing pulse.

Figure 10:
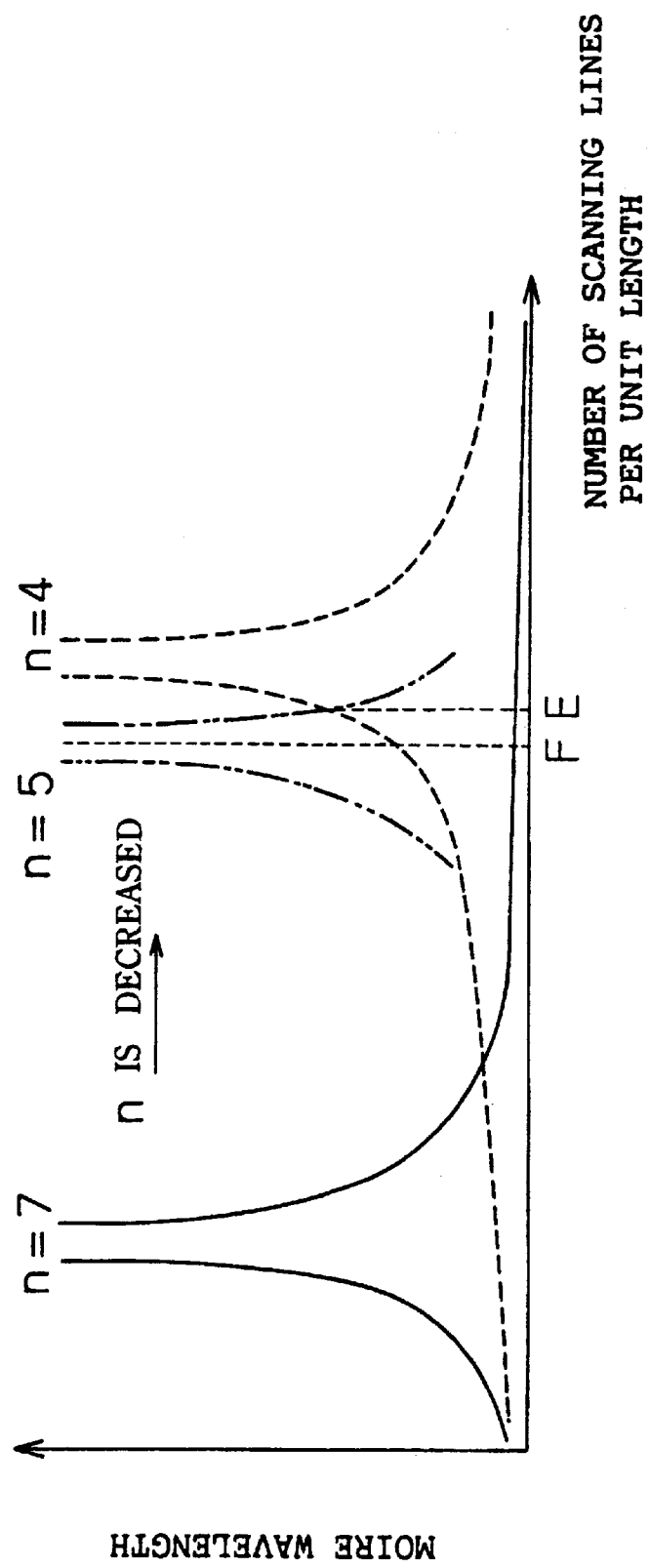
FIG. 10 is a diagram showing relationships between the number of scanning lines per unit length and the moire wavelength in the second embodiment of the present invention.
Figure 11:
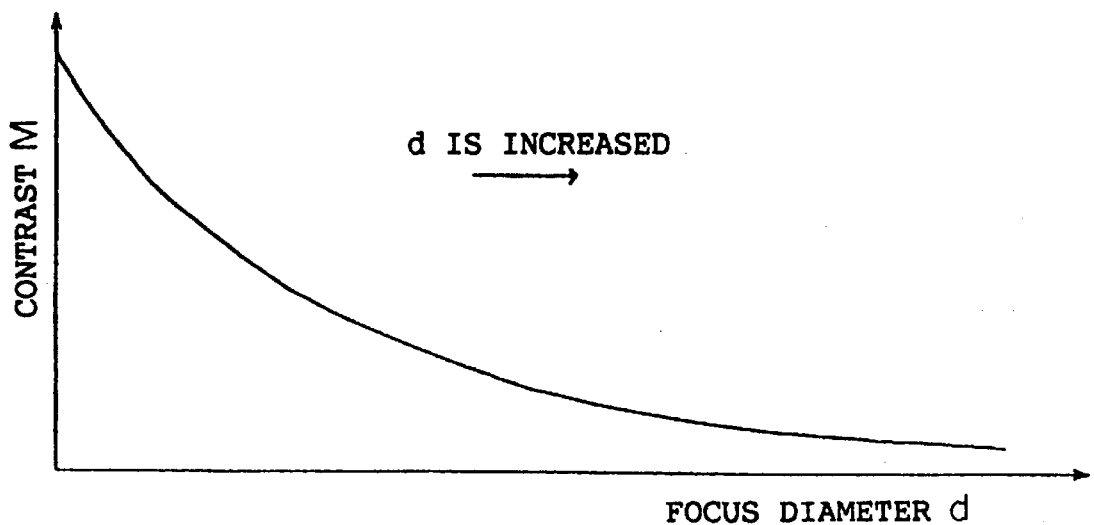
FIG. 11 is a diagram showing relationships of contrast in the second embodiment of the present invention.
Figure 12:
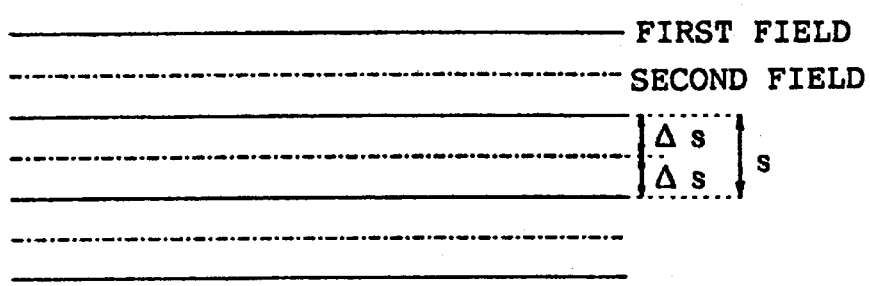
FIG. 12 is a diagram showing relationships of scanning lines in the second embodiment of the present invention.

The operation of the thus configured moire reducing apparatus of the second embodiment will be described with reference to FIGS. 9 to 12. FIG. 10 is an explanatory diagram showing relationships between the number of scanning lines per unit length and the moire wavelength λ. FIG. 11 is an explanatory diagram showing relationships between the focus diameter d and a contrast M or $\exp(-\pi^2 d^2 n^2/12s^2)$. FIG. 12 is an explanatory diagram showing relationships of scanning lines between the first and second fields.

As shown in FIG. 12, in the case where the display position in the second field is not shifted, i.e., is fixed, the moved amount as can be set to be 0.5s. Accordingly, the expression of the contrast shown in the first embodiment:

$$M = \{J1(4c)/c\} \cdot \exp(-\pi^2 d^2 n^2/12s^2) \times |\cos(\pi n \Delta s/s)|$$

is equal to the following expression:

$$M = \{J1(4c)c\} \cdot \exp(-\pi^2 d^2 n^2/12s^2)$$

In the embodiment, if the screen display height and the number of scanning lines are determined, the number of scanning lines per unit length is uniquely determined, in the same manner as the first embodiment. If the screen display height is changed and the number of scanning lines per unit length is changed, for example, from a point E in the optimum design to a point F in FIG. 10, the moire wavelength λ is the maximum and moire is very noticeable. FIG. 11 shows relationships between $\exp(-\pi^2 d^2 n^2/12s^2)$ in the contrast M and the focus diameter d at the wavelength λ at which moire is very noticeable. As shown in the figure, the contrast M is exponentially decreased as the focus diameter d is increased.

Accordingly, in order to prevent generation of moire which is visually noticeable due to the increase of the moire wavelength λ from occurring, the focus diameter d is increased in such a range that the resolution is less deteriorated. As a result, the generation of moire caused by the increase of moire wavelength λ can be suppressed.

This function will be described with reference to FIG. 9. The moire determining means 906 calculates the moire wavelength λ for the number of scanning lines per unit length. If the moire wavelength λ is large, the moire determining means 906 calculates the focus diameter d so as to realize a contrast M at which the moire is not easily noticeable, in such a range that the resolution is less deteriorated. Based on the output of the moire determining means 906, the moire correcting waveform generating means 901 outputs a correcting waveform at which the contrast of moire is minimum, to the focus correcting waveform generating means 902. The focus correcting waveform generating means 902 corrects the focus correcting waveform so that moire is minimum, in accordance with the output of the moire correcting waveform generating means 901, and outputs the resulting focus correcting waveform to the focus means 903.

As described above, according to the second embodiment, the moire determining means 906 determines the focus diameter d at which the contrast of moire is to be minimum, in accordance with the change of the number of scanning lines per unit length. Then, the correcting waveform is generated by the moire correcting waveform generating means, so that a focus characteristic in which moire is minimum can be obtained. Accordingly, it is possible to realize a moire reducing function with high accuracy and with less image deterioration.

Figure 13:
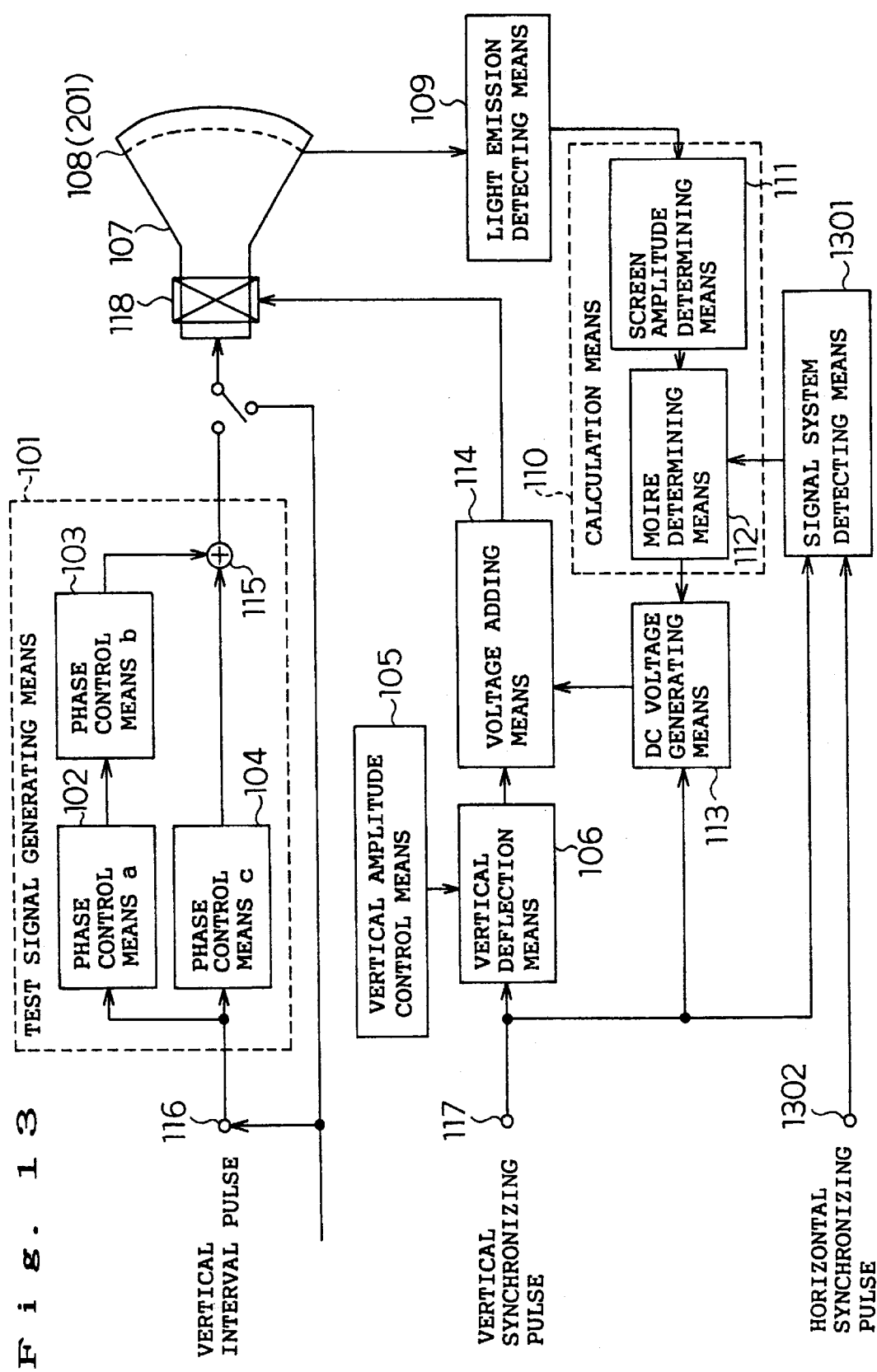
FIG. 13 is a block diagram showing a moire reducing apparatus of a third embodiment of the present invention.

A moire reducing apparatus of a third embodiment of the invention will be described with reference to FIGS. 13 to 15. FIG. 13 is a block diagram of the moire reducing apparatus of the third embodiment. The components having the same functions as those in the block diagram of the first embodiment are designated by the same reference numerals and their description is omitted. The generation and detection of the test signal, the generation of the deflecting saw-tooth wave, and the method of applying the wave to the deflecting coil 118 are the same as those in the first embodiment, and hence their description is omitted. Hereinafter, description will be conducted with focusing on signal system determining means.

In FIG. 13, signal system determining means 1301 determines the signal system on the basis of the horizontal synchronizing signal and the vertical synchronizing signal, derives the number of scanning lines, and supplies the information of the number of effective scanning lines to the moire determining means 112 which constitutes the calculation means 110.

Figure 14:
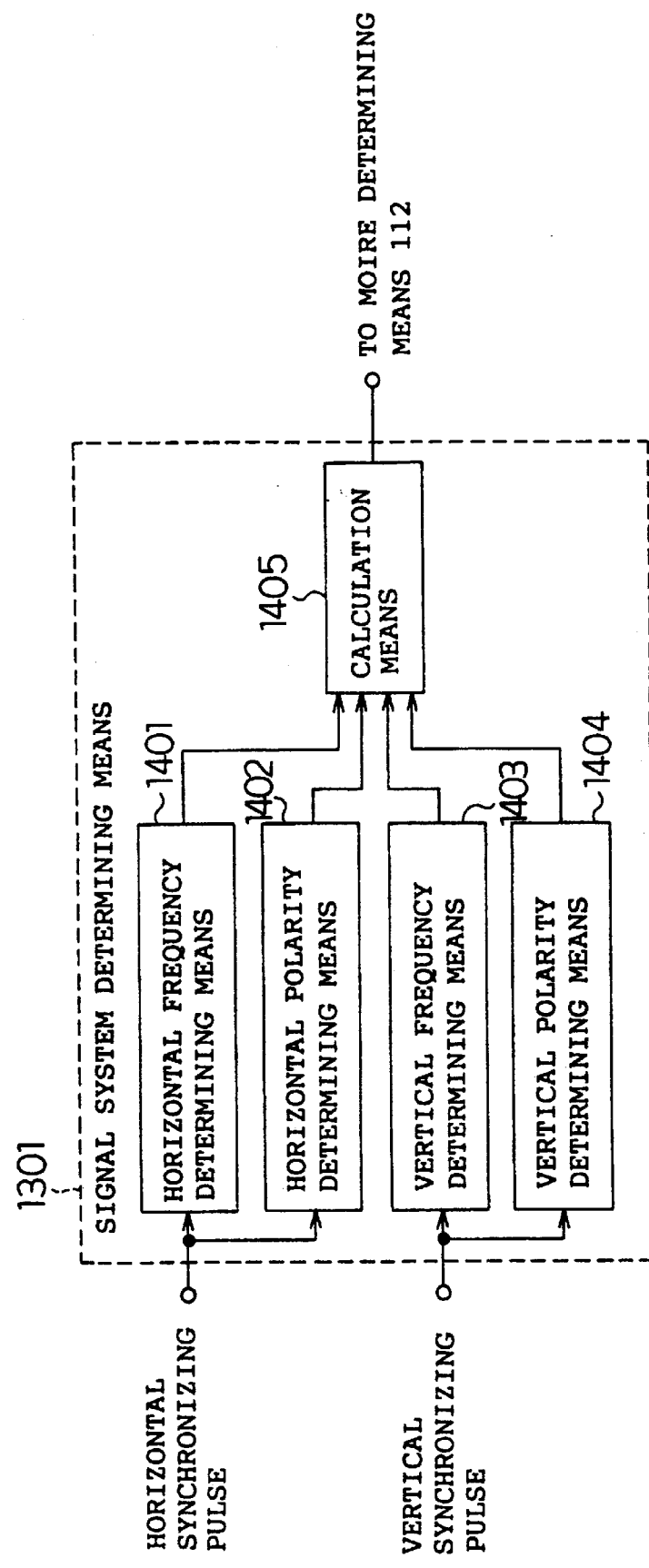
FIG. 14 is a diagram showing an example of signal system determining means in the third embodiment of the present invention.

FIG. 14 is a block diagram showing an example of the signal system determining means 1301 which comprises: horizontal frequency determining means 1401 for determining the frequency of the horizontal synchronizing signal; horizontal polarity determining means 1402 for determining the polarity of the horizontal synchronizing signal; vertical frequency determining means 1403 for determining the frequency of the vertical synchronizing signal; vertical polarity determining means 1404 for determining the polarity of the vertical synchronizing signal; and calculation means 1405. The calculation means 1405 derives the number of effective scanning lines of a coming input signal based on the outputs of the horizontal frequency determining means 1401, the horizontal polarity determining means 1402, the vertical frequency determining means 1403, and the vertical polarity determining means 1404.

The operation of the moire reducing apparatus having the above-described configuration will be described below.

A monitor for a computer which is now widely used is generally ready for multi-scan, and various input signal systems are used. If a different signal system is used, the number of effective scanning lines displayed on the screen is different. Accordingly, even if the display is performed at the same screen height, the number of scanning lines per unit length is changed, and the moire wavelength λ at which moire is visually noticeable is changed. In order to reduce moire in a multi-scan-ready monitor, therefore, it is necessary to determine the input signal system and derive the number of effective scanning lines.

Table 1 shows signal systems which are usually used.

TABLE 1

|  | Dots × Lines | fH(kHz) | fV(kHz) | V.BLK(ms) | HD | VD |
|---|---|---|---|---|---|---|
| VGA350 | 640 × 350 | 31.5 | 70 | 3.146 | + | − |
| VGA400 | 640 × 400 | 31.5 | 70 | 1.557 | − | + |
| VGA480 | 640 × 480 | 31.5 | 60 | 1.430 | − | − |
| VESA | 640 × 480 | 37.8 | 72.8 | 1.057 | − | − |
| VESA | 800 × 600 | 37.88 | 60.3 | 0.739 | + | − |

As seen from the table, in some cases, the number of effective scanning lines is varied for the same horizontal and vertical frequencies. In such a case, as shown in Table 1, it is possible to determine the signal system on the basis of the difference in polarities of the horizontal and vertical synchronizing signals.

The horizontal frequency determining means 1401 which constitutes the signal system determining means 301 determines the horizontal frequency by measuring the rising period of pulses of the horizontal synchronizing signal. The horizontal polarity determining means 1402 determines the horizontal synchronization polarity, for example, by peak-clamping the horizontal synchronizing signal and examining the magnitude of the average DC voltage.

The vertical frequency determining means 1403 determines the vertical frequency based on the rising period of pulses of the vertical synchronizing signal. The vertical polarity determining means 1404 determines the vertical synchronization polarity by peak-clamping the vertical synchronizing signal and examining the magnitude of the average DC voltage.

The calculation means 1405 determines the currently input signal system based on the pattern of the pulses output from the above-mentioned four determining means, and outputs the information of the number of effective scanning lines to the moire determining means 112, in accordance with the determination results. The moire determining means 112 calculates the scanning-line shift amount from the number of effective scanning lines and the screen amplitude information output from the screen amplitude determining means 111. The calculated scanning-line shift amount is output to the DC voltage generating means 113.

In the case of 640 dots by 350 lines of VGA, for example, the horizontal frequency is 31.5 kHz, the vertical frequency is 70 Hz, the horizontal synchronization polarity is plus, and the vertical synchronization polarity is minus. Based on the information, the effective scanning line information indicative of 350 effective scanning lines is output. In another case of 640 dots by 400 lines of VGA having the same horizontal and vertical frequencies, the horizontal synchronization polarity is minus, and the vertical synchronization polarity is plus. Therefore, the effective scanning line information indicative of 400 effective scanning lines is output.

Figure 15:
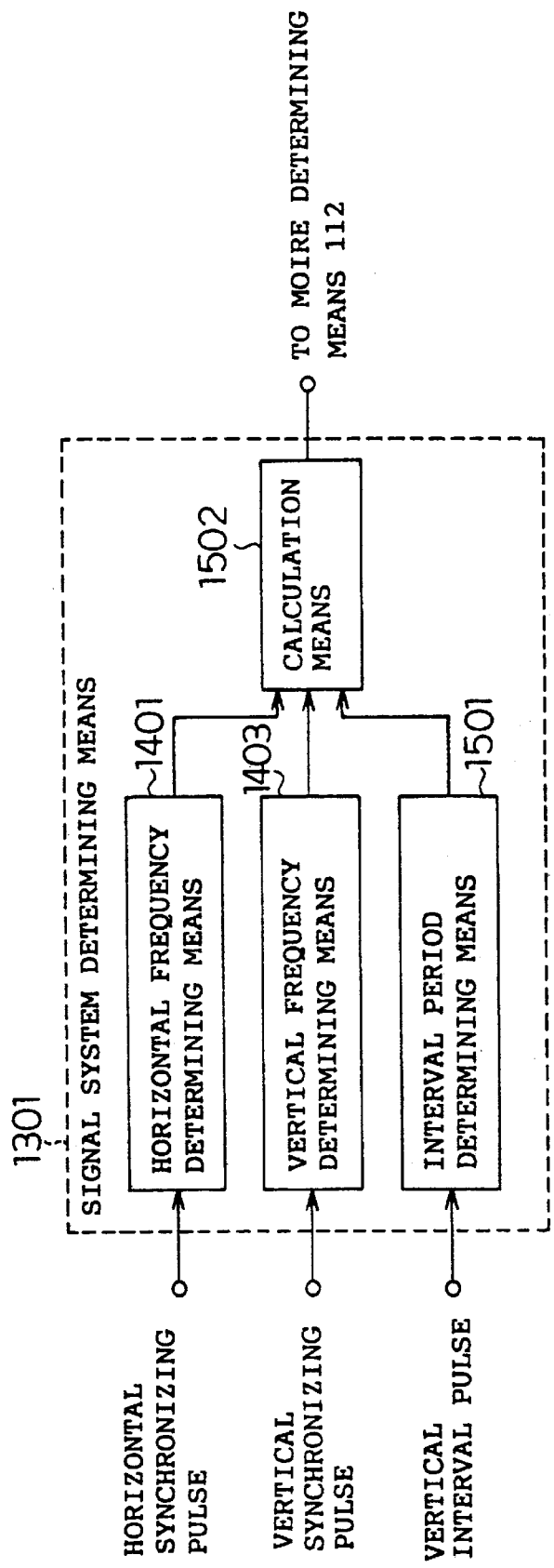
FIG. 15 is a diagram showing another example of the signal system determining means in the third embodiment of the present invention.

FIG. 15 is a block diagram showing another example of the signal system determining means. Description of the components having the same functions as those in FIG. 14 is omitted.

Vertical interval period determining means 1501 detects the time width of the interval period from the vertical interval signal. Calculation means 1502 determines the number of effective scanning lines of the input signal, based on the horizontal frequency obtained by the horizontal frequency determining means 1401, the vertical frequency obtained by the vertical frequency determining means 1402, and the time width of the interval period obtained by the vertical interval period determining means 1501.

A video portion actually displayed on the CRT 107 is the portion excluding the interval period. Consequently, the number of effective scanning lines is obtained by the calculation means from the horizontal frequency and the portion of the vertical frequency excluding the interval period. When the horizontal frequency is denoted by H, the vertical frequency is denoted by V, and the time width of the interval period is denoted by Tb, the number T of effective scanning lines is obtained by the following expression:

$$T = H / \{1/(1/V - Tb)\}$$

In the case of 640 dots by 350 lines of VGA, for example, the horizontal frequency is 31.5 kHz, the vertical frequency is 70 Hz, and the interval period is 3.146 msec., so that the number T of scanning lines is obtained in the following manner:

$$T = 31.5 \text{ kHz} / \{1/(1/70 \text{ HZ} - 3.146 \text{ msec.})\}$$
$$= 350$$

In the case of 640 dots by 400 lines of VGA, the horizontal and vertical frequencies are the same, and the interval period is 1.577 msec., so that the number T is obtained as follows:

$$T = 31.5 \text{ kHz} / \{1/(1/70 \text{ Hz} - 1.577 \text{ msec.})\}$$
$$= 400$$

Figure 16:
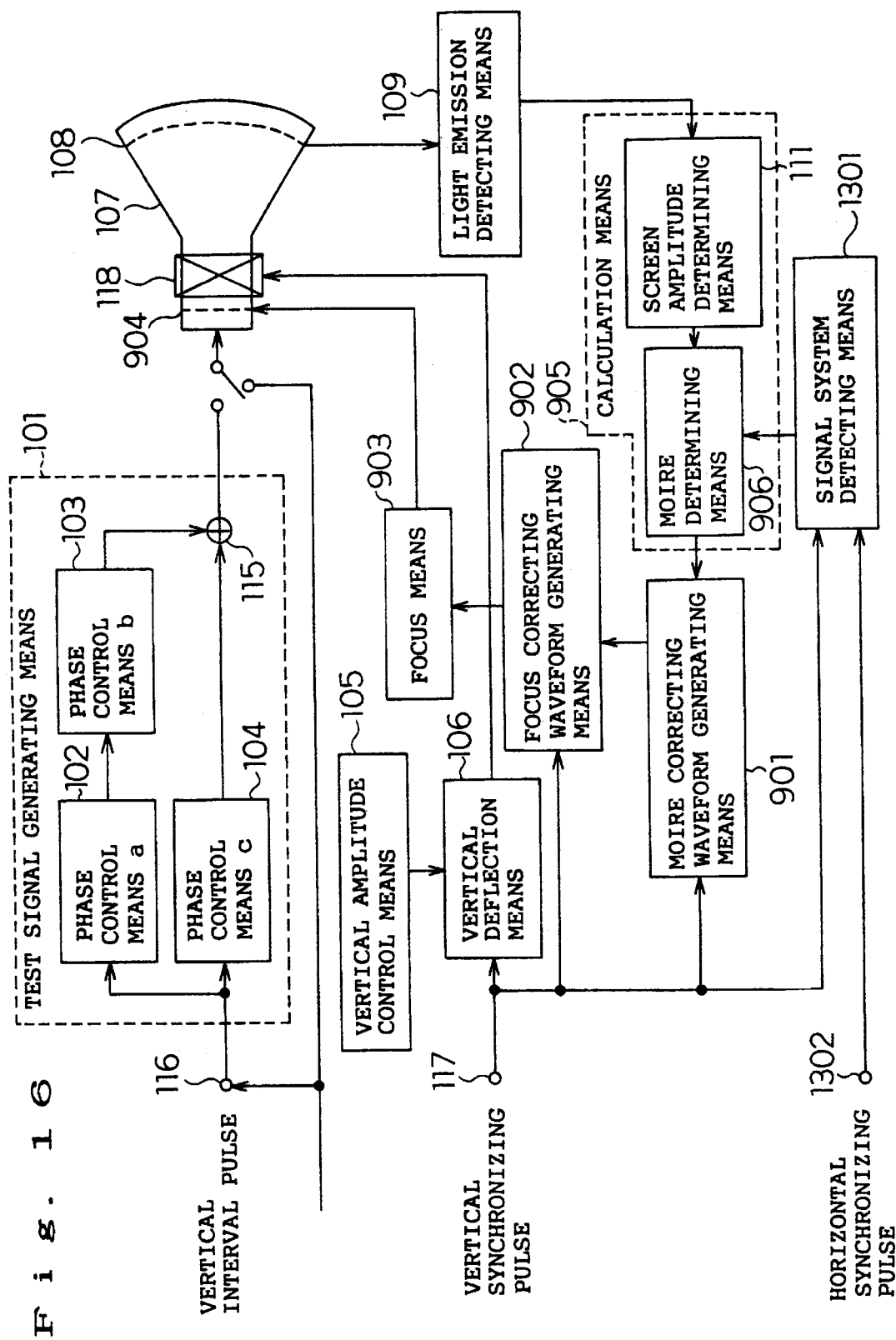
FIG. 16 is a block diagram showing a modification of the moire reducing apparatus of the third embodiment of the present invention.

FIG. 16 is a block diagram showing another embodiment of the invention in which the signal system determining means of the invention is added to the second embodiment.

As described above, the signal system determining means of the embodiment is provided in the second embodiment. When the input signal system is changed and the number of scanning lines per unit length is changed, the focus diameter d is increased by the moire determining means 906 in the range in which the resolution is less deteriorated. Then, a correcting waveform is generated by the moire correcting waveform generating means 901 so that the moire contrast is reduced, and the generated correcting waveform is output to the focus correcting waveform generating means 902. The focus correcting waveform generating means 902 generates a focus correcting waveform at which moire is minimum, based on the synchronizing pulse and the output of the moire correcting waveform generating means 901. The generated focus correcting waveform is output to the focus means 903.

In this way, according to the embodiment, the signal system is determined by the signal system determining means based on the frequencies and polarities of the synchronizing signals, or the number of effective scanning lines is derived from the frequencies of the synchronizing signals and the time width of the vertical interval signal, so that the number of effective scanning lines of the input signal can be accurately obtained. Thus, it is possible to attain a moire reducing effect with high accuracy.

Figure 17:
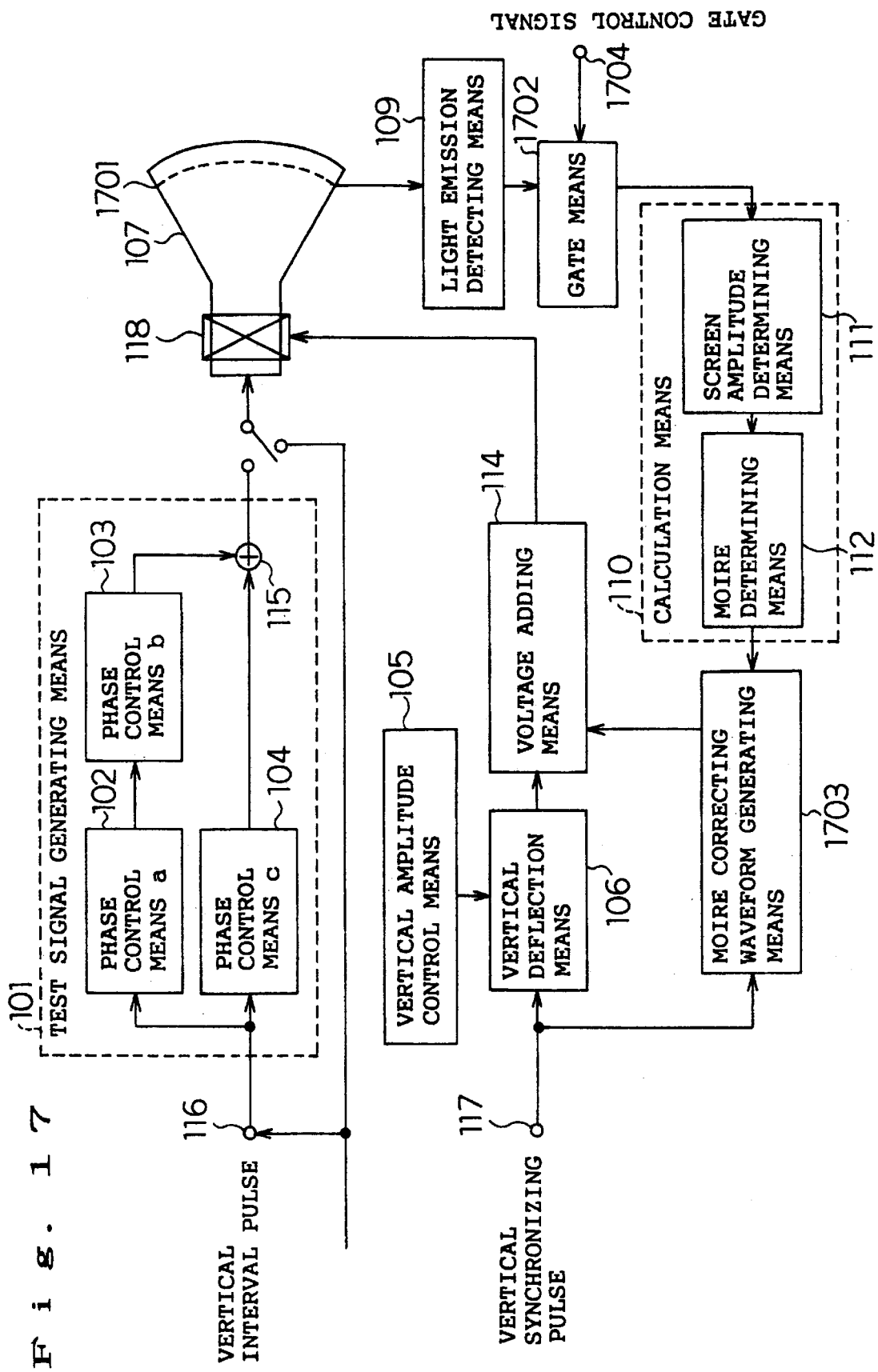
FIG. 17 is a block diagram showing a moire reducing apparatus of a fourth embodiment of the present invention.

A moire reducing apparatus of a fourth embodiment of the invention will be described with reference to FIGS. 17 to 22. FIG. 17 is a block diagram showing the moire reducing apparatus of the fourth embodiment. The components having the same functions as those in the block diagram of the first embodiment are designated by the same reference numerals and their description is omitted.

In FIG. 17, 1701 designates a shadow mask on which luminous elements are applied to two portions such as a center portion and a peripheral portion in the vertical direction, and 1702 designates gate means for selectively outputting even-numbered pulses or odd-numbered pulses among pulses output from the light emission detecting means 109, in accordance with a gate control signal supplied to an input terminal 1704. The reference numeral 1703 designates moire correcting waveform generating means for generating a correcting waveform required for reducing moire, in accordance with the output of the moire determining means 112.

Figure 18:
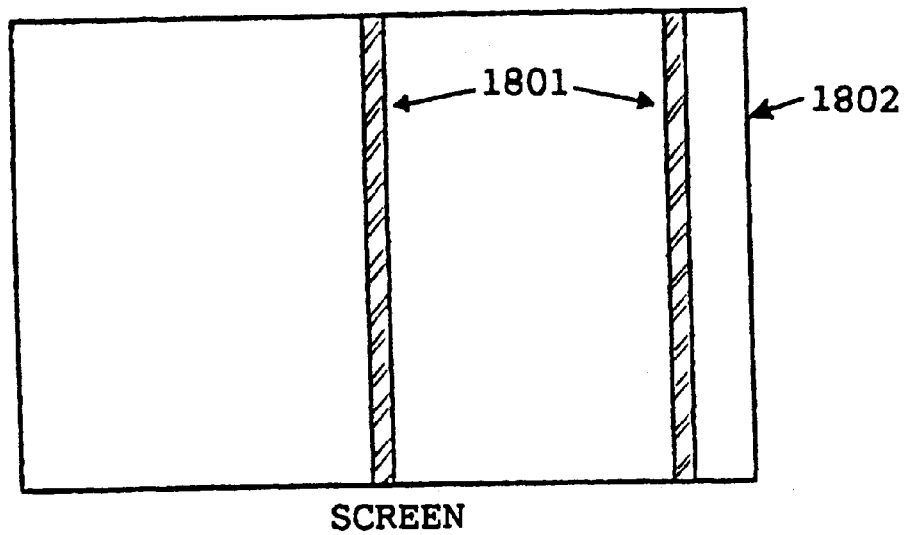
FIG. 18 is a section view showing a shadow mask in the fourth embodiment of the present invention.

FIG. 18 shows an overview of the shadow mask 1701. The reference numeral 1801 designates the luminous elements. The luminous elements 1801 are applied to the center and peripheral portions of the shadow mask in the vertical direction, for example, from the top end to the bottom end.

The operation of the thus configured moire reducing apparatus of the fourth embodiment will be described.

Figure 19:
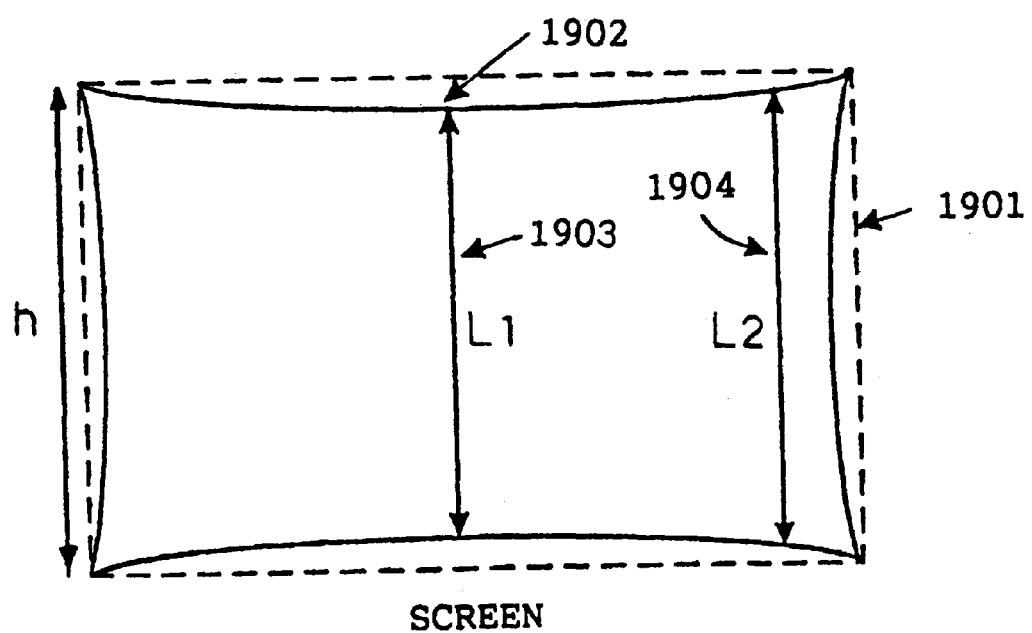
FIG. 19 is a view showing an actual screen condition in the fourth embodiment of the present invention.
Figure 20:
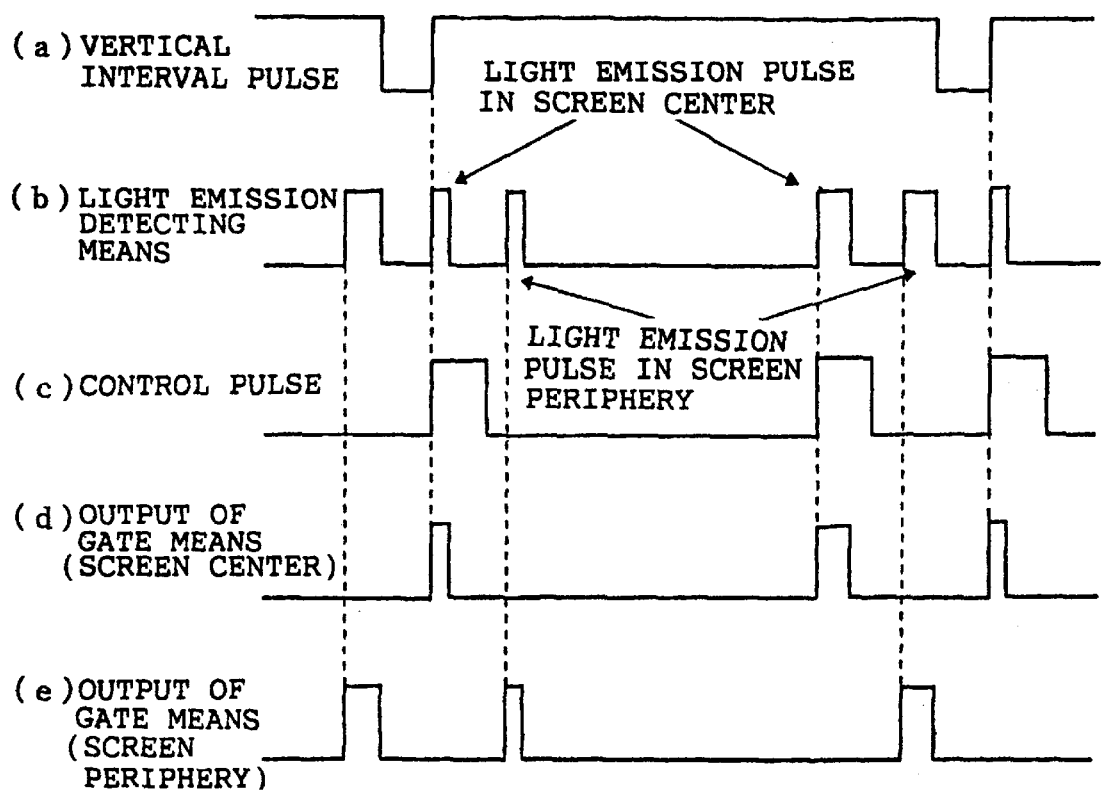
FIG. 20 is a waveform chart showing the operation of the fourth embodiment of the present invention.

FIG. 19 is a schematic view of a display condition on a screen. The broken line 1901 shows a display screen in an ideal condition, and the solid line 1902 shows an actual display screen. The reference numerals 1903 and 1904 designate actual display screen heights L1 and L2 in the screen center and the screen periphery, respectively.

In a display device using a CRT, the curvature of the display face is not constant. A CRT which is now mainly and widely used is a landscape type of 16:9, so that the actual display screen contains a deflection distortion such as that indicated by 1902 with respect to the ideal screen 1901 as shown in FIG. 19, because of the difference in deflection distance of electron beams. Such a deflection distortion is also contained in a type of 4:3 CRT. Accordingly, the center and the periphery of the screen are slightly different from each other in the screen height so that the number of scanning lines per unit length is varied. As a result, an optimum scanning-line shift amount required for reducing moire in the screen center portion is different from that in the peripheral portion.

Figure 21:
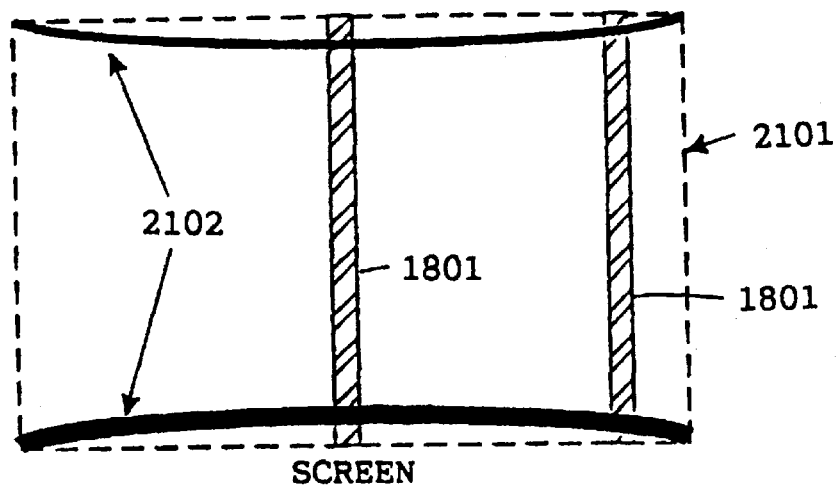
FIG. 21 is a view of a CRT screen showing relationships between luminous elements and a test signal in the fourth embodiment of the present invention.
Figure 22:
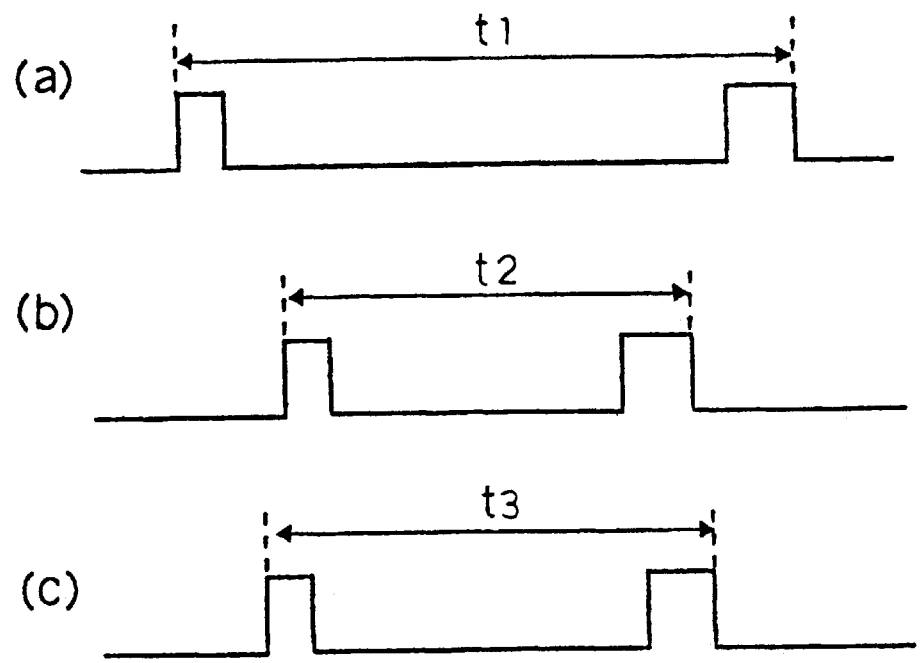
FIG. 22 is a waveform chart showing the outputs of luminous elements in the fourth embodiment of the present invention.

In the embodiment, as shown in FIG. 18, the luminous elements are applied to the screen center and the screen periphery of the shadow mask in the vertical direction, and light emission time periods are respectively detected. FIG. 21 shows relationships between the luminous elements and the test signal in this case. The light emission detecting means 109 outputs pulses including light emission of both the screen center and the periphery as shown in FIG. 22(b). Accordingly, a control signal shown in FIG. 20(c) is input to the gate means 1702, so that the pulses output from the light emission detecting means 109 are classified into two kinds of pulses, i.e., even-numbered pulses and odd-numbered pulses.

Specifically, the gate means 1702 operates as follows. In the case where light emission in the screen center is to be measured, for example, odd-numbered pulses only are output to the screen amplitude determining means 111 as shown in FIG. 20(d). By contrast, when light emission in the screen periphery is to be measured, even-numbered pulses only are output to the screen amplitude determining means 111 as shown in FIG. 20(e).

As for the derivation of the actual screen height, the vertical amplitude control means 105 is first controlled as described in the first embodiment, so as to realize a just scan condition. Then, the gate means 1702 is controlled so as to output only odd-numbered pulses, and the screen amplitude determining means 111 measures the time period of the light emission in the screen center.

Next, an actual display screen such as a display condition shown in FIG. 21 is realized, and screen heights in the screen center portion and the peripheral portion are measured, respectively, in the following procedure.

The gate means 1702 first outputs odd-numbered pulses shown in FIG. 20(d) as light emission pulses in the screen center portion in accordance with the control pulse shown in FIG. 20(c). Next, the gate means 1702 outputs even-numbered pulses shown in FIG. 20(e) as light emission pulses in the screen peripheral portion in accordance with the control pulse. The thus obtained light emission detection signals have the relationships shown in FIG. 22.

When the light emission time period in the just scan condition is denoted by t1 as shown in FIG. 22(a), the light emission time period in the screen center portion in the actual use is denoted by t2 as shown in FIG. 22(b), the light emission time period in the screen peripheral portion in the actual use is denoted by t3 as shown in FIG. 22(c), the screen height of the CRT is denoted by h (known), the display height in the center portion in the actual use is denoted by L1, and the display height in the peripheral portion is denoted by L2, the actual screen heights are respectively derived in accordance with the proportional relationships as follows:

$$L1=(t2/t1) \times h$$

$$L2=(t3/t1) \times h$$

Therefore, the moire determining means 112 calculates optimum scanning-line shift amounts from the actual screen heights in the screen center and peripheral portions and the number of scanning lines.

The moire correcting waveform generating means 1703 generates a correcting waveform so as to differentiate the shift amount in the center portion from that in the peripheral portion, based on the calculations in accordance with the scanning-line shift amounts calculated by the moire determining means 112. For example, a correcting waveform by which the shift amount is linearly varied as moving from the center portion to the peripheral portion is generated. The voltage adding means 114 adds the output of the moire correcting waveform generating means 1703 to that of the vertical deflection means 106, and the addition result is applied to the deflection coil 118. Thus, in both the screen center portion and the peripheral portion, the display position is shifted by an optimum shift amount.

Figure 23:
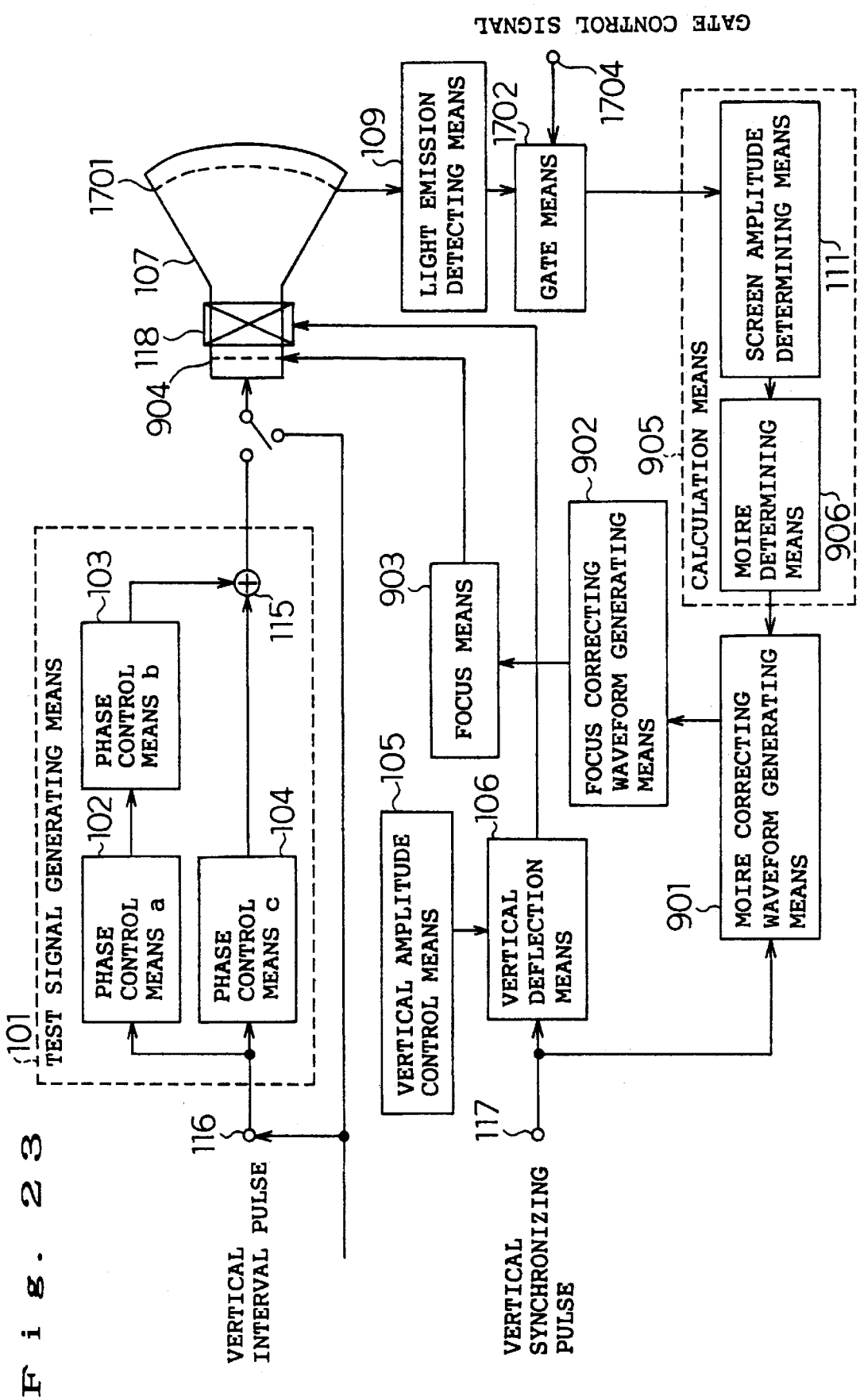
FIG. 23 is a block diagram showing a modification of the moire reducing apparatus of the fourth embodiment of the present invention.

FIG. 23 is a block diagram showing another embodiment of the invention in which a CRT wherein luminous elements are applied to the screen center and peripheral portions in the vertical direction, and the gate means of the invention are added to the second embodiment.

As described above, the CRT on which luminous elements are applied to the screen center and peripheral portions in the vertical direction, and the gate means of the embodiment are provided in the second embodiment, so that optimum focus diameters d are respectively calculated in the moire determining means 112 from the actual screen heights in the screen center and peripheral portions and the number of scanning lines.

The moire correcting waveform generating means 901 generates a correcting waveform based on calculations so as to differentiate a focus diameter in the center portion from that in the peripheral portion, in accordance with the focus diameter information of the moire determining means 906. The focus correcting waveform generating means 902 generates a focus correcting waveform at which moire is minimum, from the synchronizing pulse and the output of the moire correcting waveform generating means 901. The generated focus correcting waveform is output to the focus means 903.

In this way, according to the embodiment, luminous elements are applied to the center portion of the inner face of the shadow mask of the CRT and the peripheral portion in the vertical direction, and light emission of the luminous elements is detected by the light emission detecting means. Thus, the information of the actual screen amplitude is obtained. Even in the case where the display screen has a deflection distortion in some degree and the screen amplitude in the screen center portion is different from that in the screen peripheral portion, therefore, optimum scanning-line shift amounts or focus characteristics can be realized at respective screen positions. Accordingly, it is possible to attain a moire reducing effect with less image deterioration and with high accuracy.

A moire reducing apparatus of a fifth embodiment of the invention will be described with reference to FIGS. 24 to 27.

Figure 24:
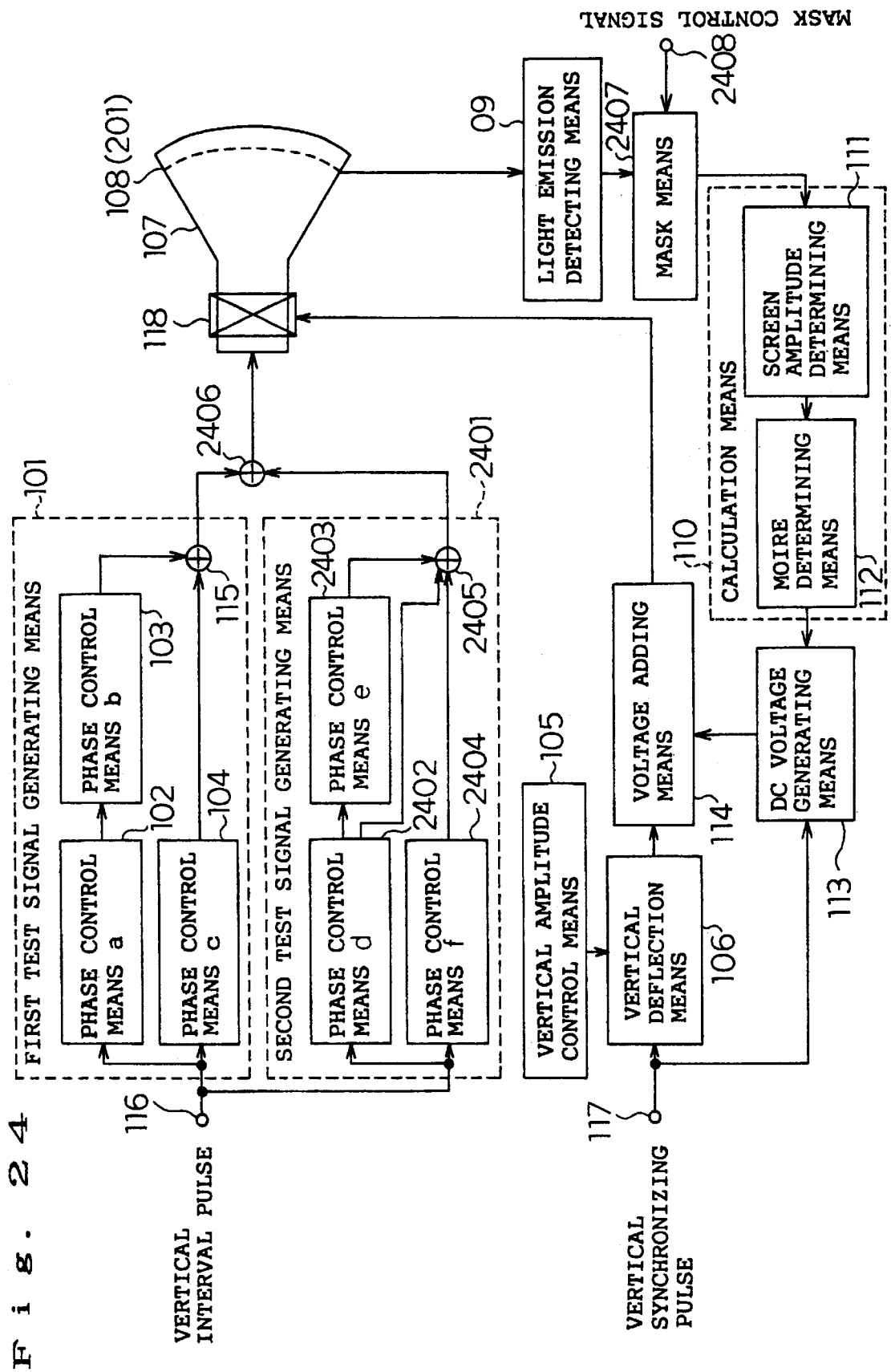
FIG. 24 is a block diagram of a moire reducing apparatus of a fifth embodiment of the present invention.

FIG. 24 is a block diagram of the moire reducing apparatus of the fifth embodiment. The components having the same functions as those in the block diagram of the first embodiment are designated by the same reference numerals and their description is omitted.

In FIG. 24, second test signal generating means 2401 comprises phase control means d 2402, phase control means e 2403, phase control means f 2404, and an adder 2405. The second test signal generating means 2401 generates a second test signal having a pulse interval which is relatively narrower than the first test signal generated by the first test signal generating means 101. An adder 2406 adds the second test signal to the first test signal, and the addition result is supplied to the CRT 118. Mask means 2407 extracts a pulse required for measuring the light emission time period from the light emission detection signal which is the output of light emission detecting means.

The operation of the moire reducing apparatus having the above-described configuration will be described with reference to the waveform chart of FIG. 25.

Figure 25:
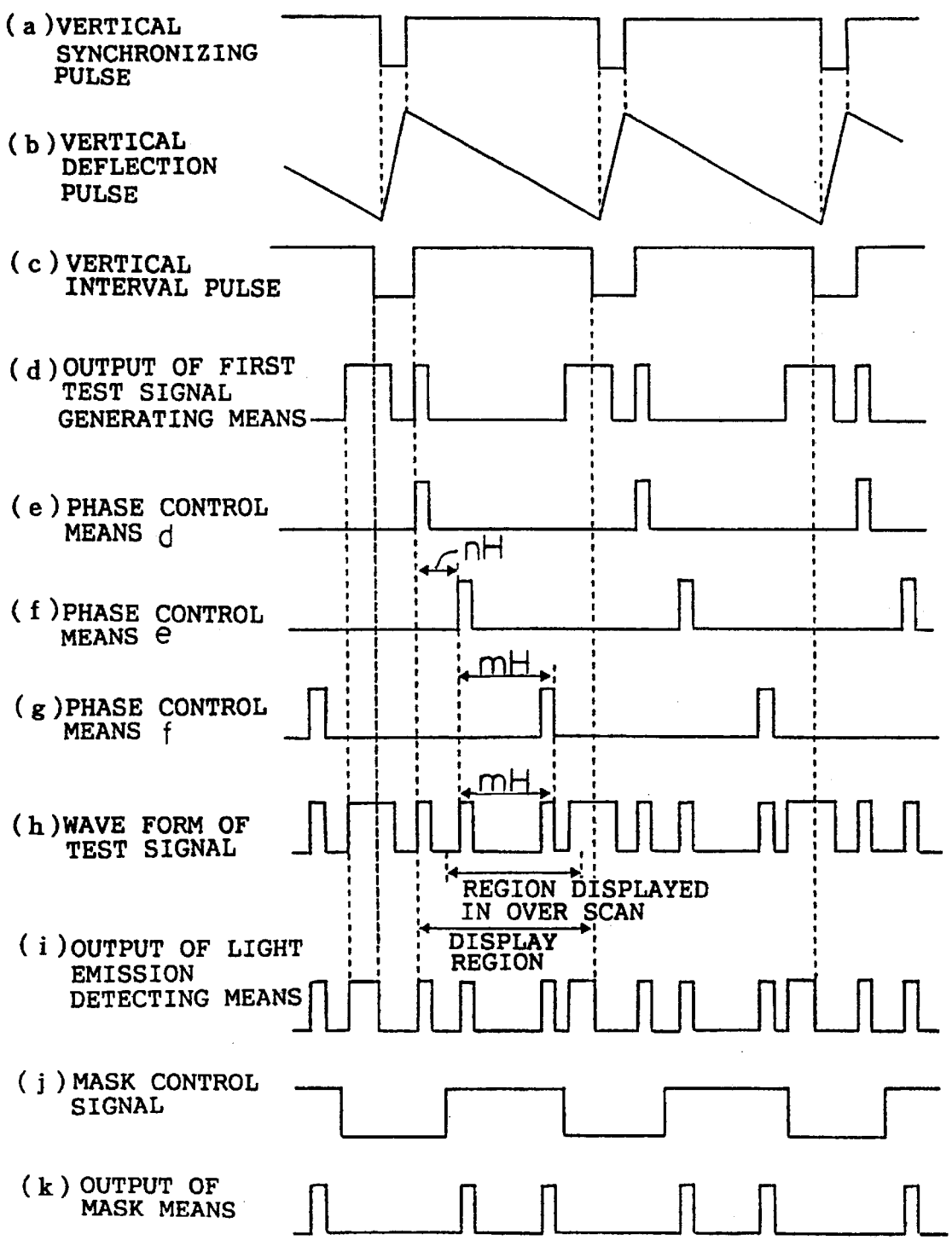
FIG. 25 is a waveform chart showing the operation of the fifth embodiment of the present invention.

The phase control means d 2402 generates a pulse shown in FIG. 25(*e*) which is synchronized with a rising edge of the vertical interval pulse (c) supplied to the input terminal 116 and has a high-level period that is relatively short but equal to or longer than one horizontal scanning period. The phase control means e 2403 generates a pulse shown in FIG. 25(*f*) which rises after elapse of n horizontal scanning periods and in synchronization with a rising edge of the pulse shown in FIG. 25 (*e*) generated by the phase control means d 2402, and which has a high-level period that is relatively short but equal to or longer than one horizontal scanning period. Similarly, the phase control means f 2404 generates a pulse shown in FIG. 25(*g*) which falls after elapse of m horizontal scanning periods and in synchronization with a rising edge of the pulse as shown in FIG. 25(*f*) generated by the phase control means e 2403, and which has a high-level period that is relatively short but equal to or longer than one horizontal scanning period. The adder 2405 adds the pulses output from the phase control means d, e, and f to each other, and the addition result is supplied to one of the input terminals of the adder 2406. As a result, there always exist m scanning lines in a period from the rising edge of one pulse to the falling edge of the next pulse in the output of the adder 2405. The adder 2406 adds the output of the adder 2405 to the output of the first test signal generating means 101, and a test signal as shown in FIG. 25(*h*) is supplied to the CRT 107.

The mask means 2407 operates in the following manner in accordance with a mask control signal shown in FIG. 25(*j*). In a detection signal which is the output of the light emission detecting means 109 and which contains a plurality of light emission pulses (four light emission pulses in the embodiment) in one vertical scanning period as shown in FIG. 25(*i*), the mask means 2407 masks pulses in a predetermined time period, in the embodiment, the two pulses in a low-level period of the control signal (outer pulses), and supplies only the pulses in a high-level period of the control signal (inner pulses) to the calculation means 110 as shown in FIG. 25(*k*).

Figure 26:
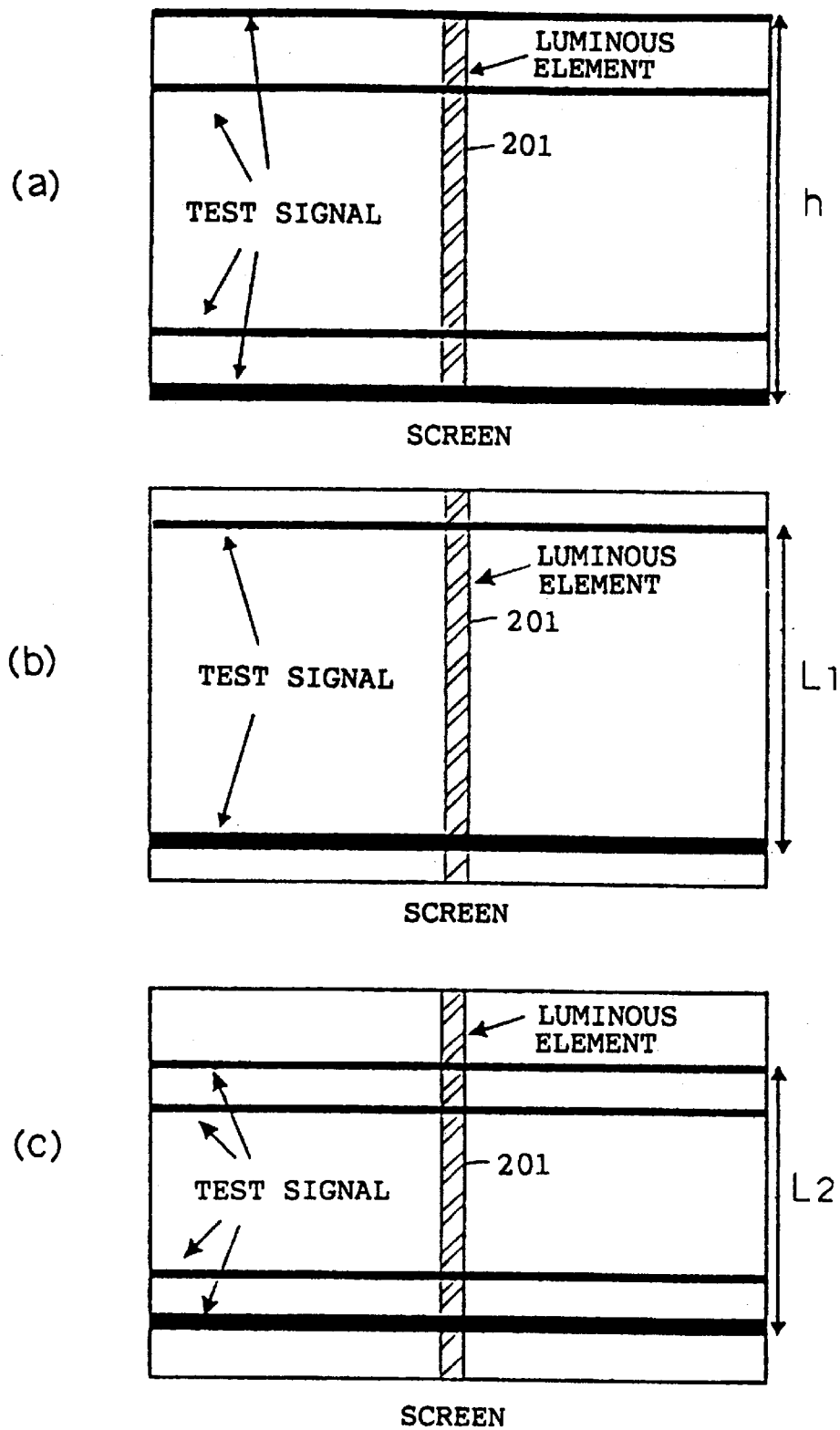
FIG. 26 is a view of a CRT screen showing relationships between a luminous element and a test signal in the fifth embodiment of the present invention.
Figure 27:
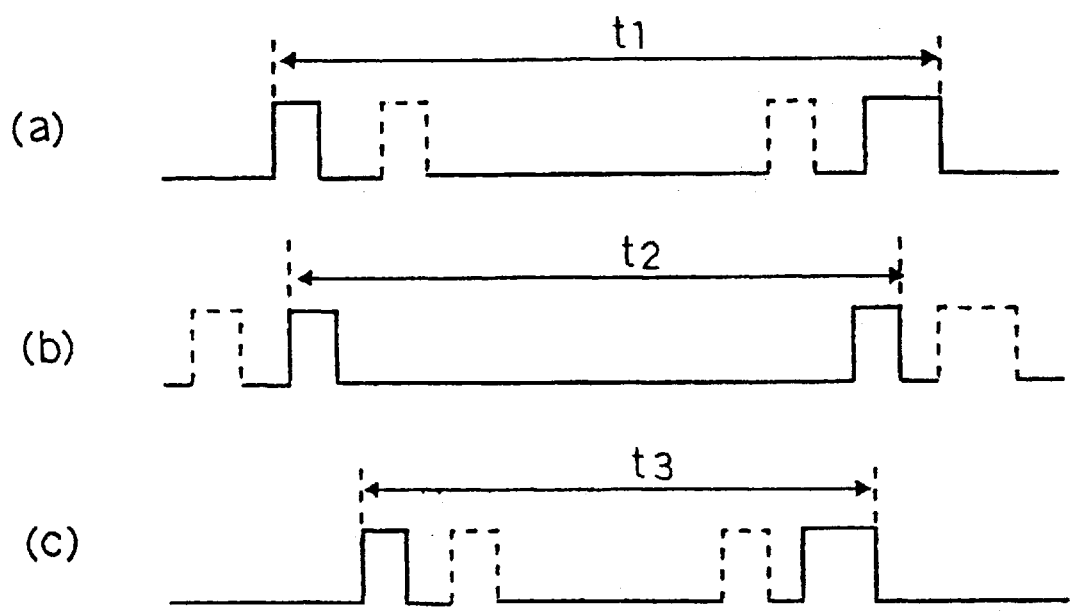
FIG. 27 is a waveform chart showing the output of the luminous element in the fifth embodiment of the present invention.

FIG. 26 shows relationships between the screen of the CRT, and a video output condition and the luminous element. In FIG. 26, (*a*) shows a just scan display condition, (*b*) shows an over scan display condition, and (*c*) shows an under scan display condition. FIG. 27 shows light emission time periods of the luminous element in the display conditions of FIG. 26.

As described in the first embodiment, the vertical amplitude control means 105 is controlled so as to realize the just scan condition shown in FIG. 26(a). At this time, in accordance with a mask control signal having a polarity which is opposite to that of the mask control signal shown in FIG. 25(j), the mask means 2407 operates so as to mask two inner pulses and supply only outer pulses to the calculation means 110. The screen amplitude determining means 111 measures the light emission time period from the light emission detection signal in which the inner pulses are masked by the mask means 2407, and obtains the light emission time period t1, as shown in FIG. 27(a).

In the actual display screen, i.e., in the case of the over scan display as shown in FIG. 26(b), in accordance with the mask control signal shown in FIG. 25(j), the mask means 2407 operates in the manner opposite to the just scan condition, or so as to supply only the inner pulses to the calculation means 110. (Depending on the over scan rate, light emission pulses outside the test signal may not be detected in the light emission detection signal output from the light emission detecting means 109 as shown in FIG. 27(b).) The screen amplitude determining means 111 measures the light emission time period from the light emission pulses output from the mask means 2407, and obtains the light emission time period t2.

Accordingly, when the screen height of the CRT is denoted by h (known), the height L1 between the test signals is expressed as follows:

$$L1=(t1/t2) \times h$$

Since the test signals are generated so that the display height between the test signals always contains m scanning lines, the spacing s between scanning lines is obtained as follows:

$$s=L1/m$$

When the user changes the display condition to the under scan display as shown in FIG. 26(c), the mask control signal similar to that in the just scan display is supplied to the input terminal 2408, and the mask means 2407 operates so as to supply a light emission detection signal containing only outer light emission pulses among the light emission pulses detected by the light emission detecting means 109, to the calculation means 110. The screen amplitude determining means 111 measures the light emission time period from the light emission pulses output from the mask means 2407, and obtains the light emission time period t3 as shown in FIG. 27(c).

When the display height between the test signals at this time is denoted by L2, the display height L2 is expressed by:

$$L2=(t3/t2) \times h$$

Accordingly, when the number of effective scanning lines is denoted by T, the spacing s between scanning lines is obtained in the same way as in the first embodiment:

$$s=L2/T$$

The moire determining means 112 calculates the moire waveform λ and the contrast M from the thus obtained scanning-line spacing s, and calculates an optimum scanning-line shift amount.

The DC voltage generating means 113 generates a DC vertical shift voltage which is synchronized with the vertical synchronizing signal, based on the scanning-line shift amount calculated by the moire determining means 112. The voltage adding circuit 114 adds the output of the DC voltage generating means 113 to that of the vertical deflection means 108, and the addition result is applied to the deflection coil 118.

Figure 28:
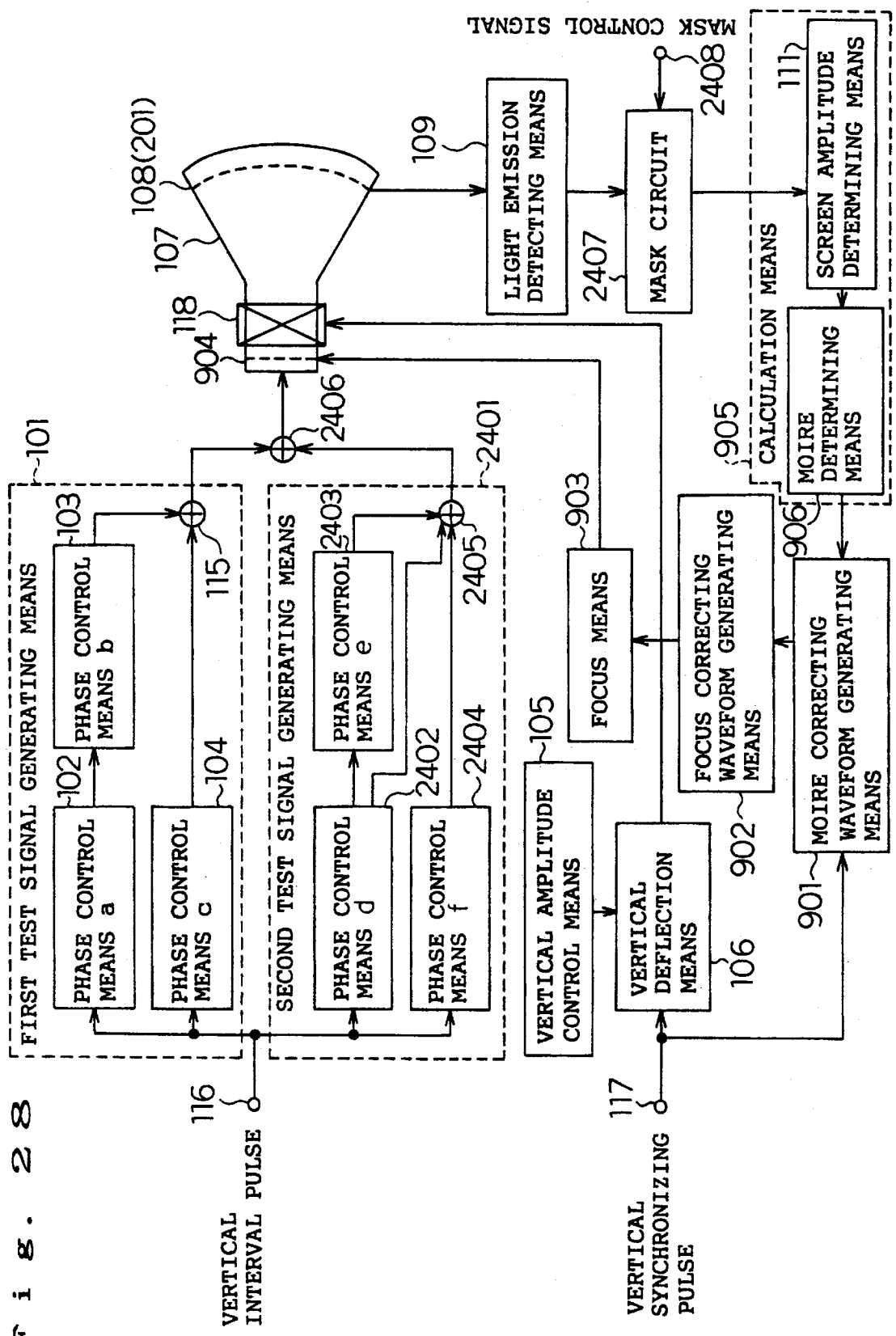
FIG. 28 is a diagram showing a modification of the moire reducing apparatus of the fifth-embodiment of the present invention.

FIG. 28 is a block diagram showing another embodiment of the invention in which the second test signal generating means and the mask circuit of the invention are added to the second embodiment.

The second test signal generating means and the mask circuit of the embodiment are provided in the second embodiment, so that optimum focus diameters d are respectively calculated by the moire determining means 906 from the screen heights and the numbers of scanning lines in the respective display conditions.

The moire correcting waveform generating means 901 generates a correcting waveform in accordance with the focus diameter information supplied from the moire determining means 906. The focus correcting waveform generating means 902 generates a focus correcting waveform at which moire is minimum, based on the synchronizing pulse and the output of the moire correcting waveform generating means 901, and the generated focus correcting waveform is output to the focus means 903.

As described above, according to the embodiment, the luminous element is applied to the center portion of the inner face of the shadow mask of the CRT, and the light emission time period of the luminous element is detected by the light emission detecting means. Thus, the information of actual screen amplitude is obtained. In addition, a signal containing not only pulses in the start and end portions but also a pulse having a width of a constant horizontal scanning period is used as the test signal, so that, even in the case where the screen display is performed by an amplitude larger than the CRT screen, such as in the case of over scan condition, the screen display height information and the information of the number of scanning lines included in the period can be precisely detected. Therefore, it is possible to realize an optimum shift amount or a focus characteristic in any display condition, and it is possible to attain a moire reducing effect with less image deterioration and with high accuracy.

Figure 29:
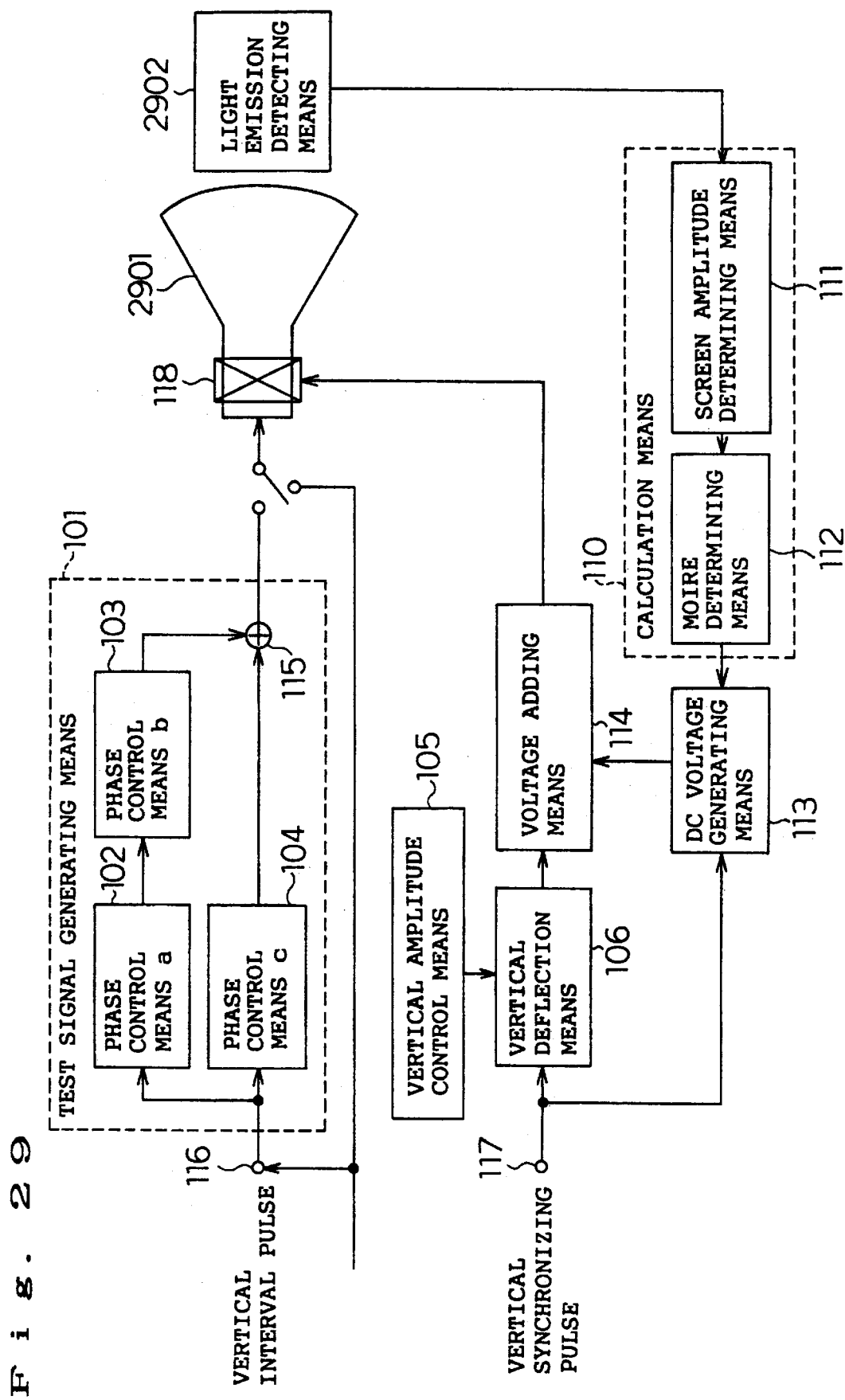
FIG. 29 is a block diagram of a moire reducing apparatus of a sixth embodiment of the present invention.
Figure 30:
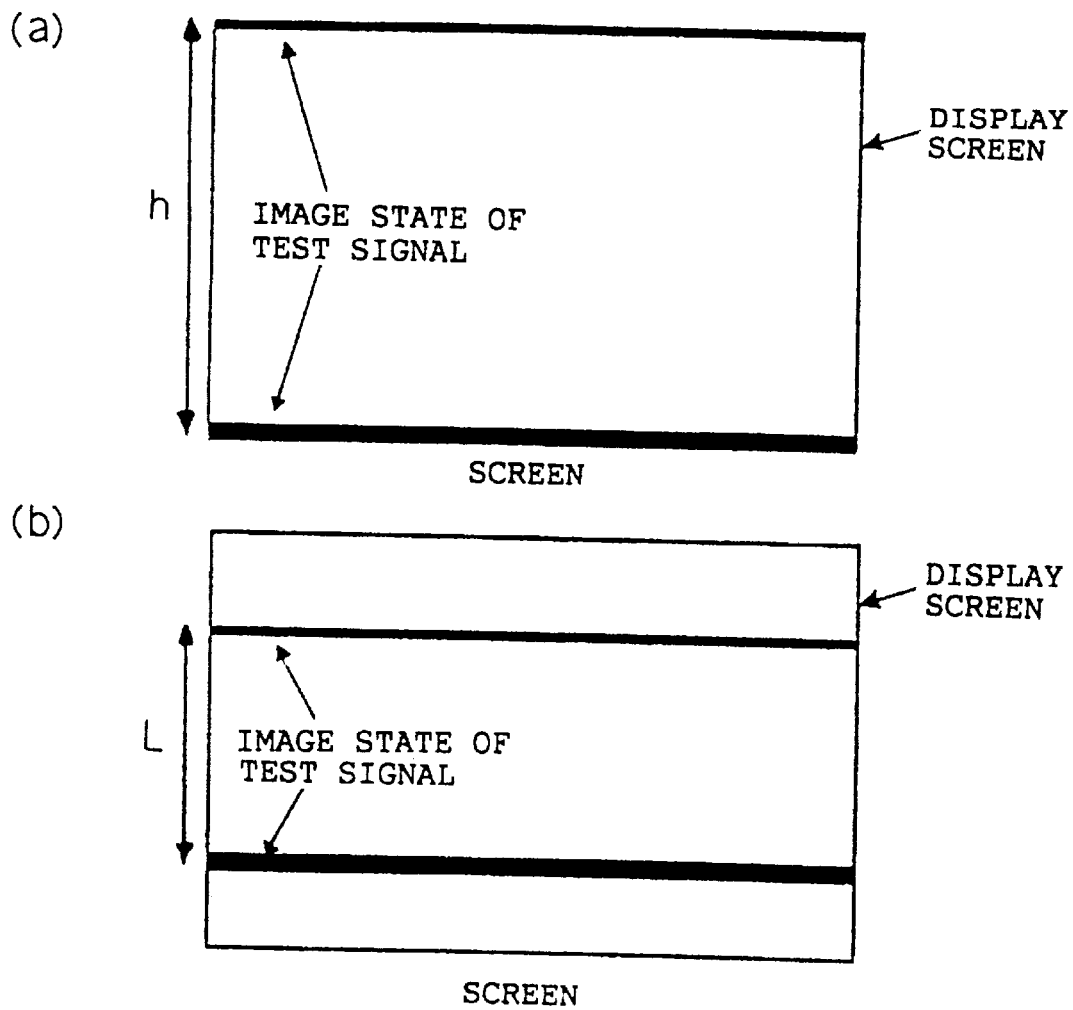
FIG. 30 is a view showing relationships between a display screen and a test signal in the sixth embodiment of the present invention.
Figure 31:
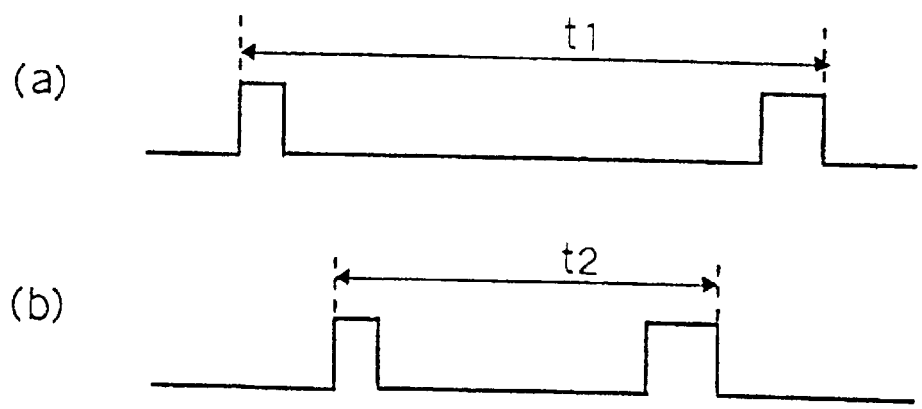
FIG. 31 is a waveform chart showing the output of a luminous element in the sixth embodiment of the present invention.

A moire reducing apparatus of a sixth embodiment of the invention will be described with reference to FIGS. 29 to 31. In FIG. 29, the components having the same functions as those in the first embodiment of the invention are designated by the same reference numerals and their description is omitted. In FIG. 29, 2901 designates a CRT, and 2902 designates light emission detecting means for detecting light emission of a test signal displayed on a screen.

Relationships of the control pulses are the same as those in the first embodiment. FIG. 30 shows a display condition of the test signal on the screen. In FIG. 30, (a) shows a display condition of the test signal in a normal display (the display size is equal to the screen size), and (b) shows a display condition of the test signal when the vertical size is reduced. FIGS. 31(a) and 31(b) show light emission pulses of FIGS. 30(a) and (b) detected by the light emission detecting means 2902, respectively.

The operation of the moire reducing apparatus having the above-described configuration will be described.

The light emission detecting means 2902 in front of the CRT screen measures the output of the test signal generating means 101 which is produced by using the phase control means 102 to 104. FIG. 30 shows the screen condition at this time, and FIG. 31 shows the measurement results. In the same manner as in the first embodiment, a voltage at which the amplitude of the deflection pulse is equal to the screen height of the CRT as shown in FIG. 30(a) is applied. The light emission detecting means 2902 measures light emission on the screen during a period from the start of light emission to the end of the light emission. Next, the light emission detecting means 2902 measures light emission on the actual display screen, for example, in the case of the display condition shown in FIG. 30(*b*). When the light emission time period in the condition where the display is performed over the entire screen as shown in FIG. 30(*a*) is denoted by t1, the light emission time period in an actual use as shown in FIG. 30(*b*) is denoted by t2, the screen height of the CRT is denoted by h (known), and the actual display height is denoted by L, the actual screen height is derived in the same manner as the first embodiment of the invention in accordance with a proportional relationship as follows:

$$L = (t2/t1) \times h$$

Therefore, the screen amplitude determining means 111 determines the actual screen height, and the moire determining means 112 determines an optimum scanning-line shift amount from the screen height and the number of scanning lines. The DC voltage generating means 113 outputs a DC shift voltage which is synchronized with the vertical synchronizing signal to the voltage adding means 114, based on the scanning-line shift amount of the moire determining means 112. The voltage adding means 114 adds the output of the DC voltage generating means to the output of the vertical deflection means 106, and the resulting voltage is applied to the deflection coil 118.

Figure 32:
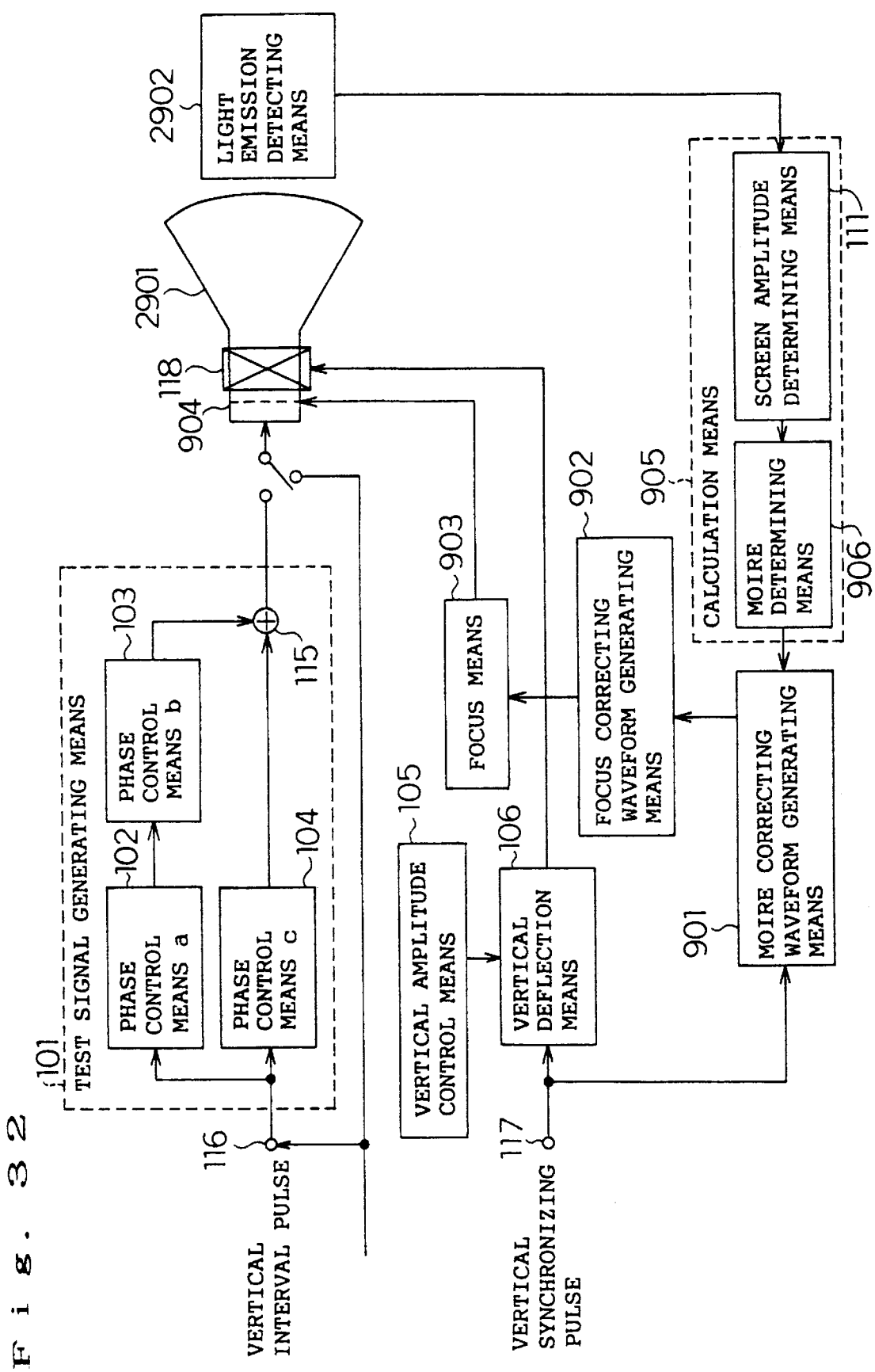
FIG. 32 is a block diagram showing a modification of the moire reducing apparatus of the sixth embodiment.
Figure 33A:
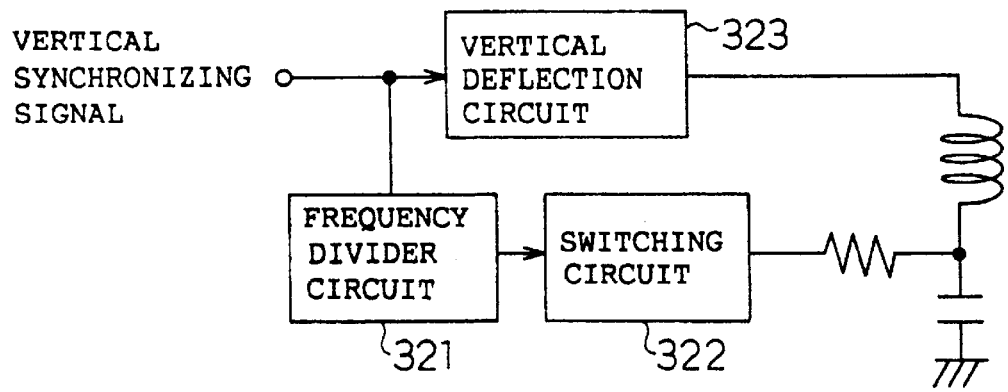
FIG. 33 is a view showing a conventional art.
Figure 33B:
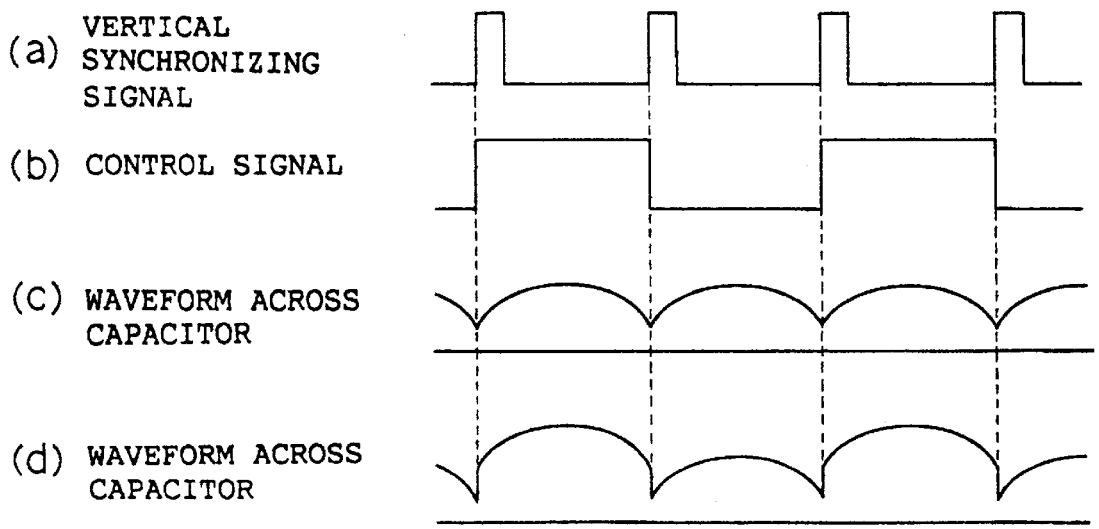
Figure 33C:
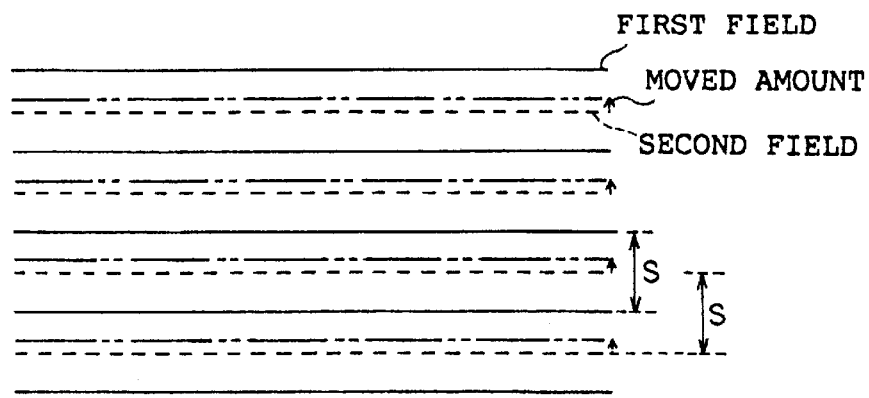

FIG. 32 is a block diagram showing another embodiment of the invention in which, as in the invention, the light emission detecting means is disposed on the side of the display screen of the CRT in the second embodiment.

As described above, the light emission detecting means is provided on the front face of the screen in the second embodiment, and optimum focus diameters d are respectively calculated by the moire determining means 112 from the screen heights and the numbers of scanning lines in the respective display conditions.

The moire correcting waveform generating means 901 generates a correcting waveform in accordance with the focus diameter information of the moire determining means 906. The focus correcting waveform generating means 902 generates a focus correcting waveform at which moire is minimum, from the synchronizing pulse and the output of the moire correcting waveform generating means 901, and the focus correcting waveform is output to the focus means 903.

As described above, according to the embodiment, light emission of the test signal on the screen is detected by the light emission detecting means. Therefore, the information of an actual screen amplitude can be obtained without using a special CRT in which a luminous element is applied on the inside of the shadow mask. Under any condition such as in the case where the screen amplitude is changed during production or by the user, therefore, an optimum shift amount can be realized. Accordingly, it is possible to attain a moire reducing effect with less image deterioration and with high accuracy.

In the fourth embodiment, the luminous elements are applied to the two portions of the shadow mask, i.e., the screen center portion and the peripheral portion. It is a matter of course that moire reduction can be realized with higher accuracy by increasing the number of portions.

In the first, second, third, fourth, and fifth embodiments, the inside portion of the shadow mask to which the luminous element is applied is set to be the screen center portion, but the portion is not limited to the screen center portion. The luminous element can be applied to any portion as far as the portion is in the range where the scanning of electron beams is performed. It is a matter of course that, even when a luminous element is applied to a plurality of portions, an optimum scanning-line shift amount can be realized.

In addition, it is a matter of course that, if the light emission detecting means is disposed on the display side of the CRT in the second, third, fourth, and fifth embodiments, the same effects as those of the sixth embodiment can be attained.

What is claimed is:

1. A moire reducing apparatus comprising:

test signal generating means for generating a test signal which is synchronized with a vertical interval pulse, and supplying the test signal to a CRT;

light emission detecting means for detecting a scanning position of the test signal output by said test signal generating means, at the CRT;

calculation means for detecting an actual screen display height from an output of said light emission detecting means, and calculating a focus diameter of electron beams in a vertical direction required for reducing moire;

moire correcting waveform generating means for generating a correction voltage signal which is synchronized with a vertical synchronizing signal, based on an output of said calculation means;

focus correcting waveform generating means for generating a waveform for controlling a focus of the CRT, by using the vertical synchronizing signal, a horizontal synchronizing signal, and a moire correcting waveform;

vertical amplitude control means for supplying a DC voltage for adjusting the screen display height in a vertical direction; and vertical deflection means for generating a saw-tooth wave for deflecting electron beams in the vertical direction, by using an output voltage of said vertical amplitude control means and the vertical synchronizing signal.

2. A moire reducing apparatus according to claim 1, wherein said light emission detecting means comprises: a light emitting element which is applied to at least one portion of a shadow mask inside the CRT on the side of an electron gun, said light emitting element having a predetermined length in the vertical direction; and a light receiving element for detecting light emission of said light emitting element.

3. A moire reducing apparatus comprising:

test signal generating means for generating a test signal which is synchronized with a vertical interval pulse, and supplying the test signal to a CRT;

light emission detecting means for detecting a scanning position of the test signal output by said test signal generating means, at the CRT;

signal system determining means for determining a signal system from a vertical synchronizing signal and a horizontal synchronizing signal;

calculation means for calculating a focus diameter of electron beams in a vertical direction required for reducing moire, from an output of said light emission detecting means and an output of said signal system determining means;

moire correcting waveform generating means for generating a correction voltage signal which is synchronized with the vertical synchronizing signal, based on an output of said calculation means;

focus correcting waveform generating means for generating a waveform for controlling a focus of the CRT, by using the vertical synchronizing signal, the horizontal synchronizing signal, and a moire correcting waveform;

vertical amplitude control means for supplying a DC voltage for adjusting a screen display height in a vertical direction; and vertical deflection means for generating a saw-tooth wave for deflecting electron beams in the vertical direction, by using an output voltage of said vertical amplitude control means and the vertical synchronizing signal.

4. A moire reducing apparatus according to claim 3, wherein said signal system determining means detects a frequency of the horizontal synchronizing signal and a frequency of the vertical synchronizing signal, and detects a polarity of an input signal, thereby determining a signal system of the input signal.

5. A moire reducing apparatus according to claim 3, wherein said signal system determining means detects a frequency of the horizontal synchronizing signal and a frequency of the vertical synchronizing signal, and detects an interval period of a vertical interval pulse, thereby determining a signal system of an input signal.

6. A moire reducing apparatus according to claim 3, wherein said light emission detecting means comprises: a light emitting element which is applied to at least one portion of a shadow mask inside the CRT on the side of an electron gun, said light emitting element having a predetermined length in the vertical direction; and a light receiving element for detecting light emission of said light emitting element.

7. A moire reducing apparatus comprising:

test signal generating means for generating a test signal which is synchronized with a vertical interval pulse, and supplying the test signal to a CRT;

light emission detecting means for detecting a scanning position of the test signal output by said test signal generating means, at the CRT;

gate means for selectively outputting an output of said light emission detecting means;

calculation means for detecting an actual screen display height from an output of said gate means, and calculating a focus diameter of electron beams in a vertical direction required for reducing moire;

moire correcting waveform generating means for generating a correction voltage signal which is synchronized with a vertical synchronizing signal, based on an output of said calculation means;

focus correcting waveform generating means for generating a waveform for controlling a focus of the CRT, by using the vertical synchronizing signal, a horizontal synchronizing signal, and a moire correcting waveform;

vertical amplitude control means for supplying a DC voltage for adjusting a screen display height in a vertical direction; and vertical deflection means for generating a saw-tooth wave for deflecting electron beams in the vertical direction, by using an output voltage of said vertical amplitude control means and the vertical synchronizing signal, and wherein said light emission detecting means has: light emitting elements which are applied to at least two different positions of a shadow mask inside the CRT on the side of an electron gun; and light receiving elements for detecting light emission of said light emitting elements.

8. A moire reducing apparatus according to claim 7, wherein said gate means selectively outputs only even-numbered pulses or only odd-numbered pulses among pulses in a pulse string which is supplied from said light emission detecting means in one vertical scanning period, in accordance with a control signal supplied from an outside.

9. A moire reducing apparatus comprising:

test signal generating means for generating a test signal which is synchronized with a vertical interval pulse, and supplying the test signal to a CRT;

light emission detecting means for detecting a scanning position of the test signal output by said test signal generating means, at the CRT;

mask means which, in accordance with a mask control signal, masks an output of said light emission detecting means in a predetermined time period;

calculation means for detecting an actual screen display height from an output of said mask means, and calculating a focus diameter of electron beams in a vertical direction required for reducing moire;

moire correcting waveform generating means for generating a correction voltage signal which is synchronized with a vertical synchronizing signal, based on an output of said calculation means;

focus correcting waveform generating means for generating a waveform for controlling a focus of the CRT, by using the vertical synchronizing signal, a horizontal synchronizing signal, and a moire correcting waveform;

vertical amplitude control means for supplying a DC voltage for adjusting a screen display height in a vertical direction; and vertical deflection means for generating a saw-tooth wave for deflecting electron beams in the vertical direction, by using an output voltage of said vertical amplitude control means and the vertical synchronizing signal, and wherein said test signal generating means generates a test signal obtained by synthesizing a first test signal which is synchronized with at least the vertical interval pulse and which is used for detecting a start and end of a video period, with one set of second test signals which are synchronized with the vertical interval pulse, time intervals of said second test signals being shorter than said first test signal.

10. A moire reducing apparatus according to claim 9, wherein said light emission detecting means has: a light emitting element which is applied to at least one portion of a shadow mask inside the CRT on the side of an electron gun, said light emitting element having a predetermined length in the vertical direction; and a light receiving element for detecting light emission of said light emitting element.

* * * * *